(12) United States Patent
Barrera et al.

(10) Patent No.: US 6,395,844 B1
(45) Date of Patent: *May 28, 2002

(54) ENHANCED DYE DURABILITY THROUGH CONTROLLED DYE ENVIRONMENT

(75) Inventors: Denise A. Barrera, Oakdale; Roberta E. Harelstad, Woodbury, both of MN (US); William D. Joseph, River Falls, WI (US); Lee A. Pavelka, Cottage Grove, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/387,996

(22) Filed: Sep. 1, 1999

Related U.S. Application Data

(62) Division of application No. 08/957,291, filed on Oct. 24, 1997, now Pat. No. 6,001,936.

(51) Int. Cl.$^7$ .............................................. C08F 283/04
(52) U.S. Cl. ........................ 525/454; 525/131; 525/457; 525/453; 525/122; 525/227; 525/121; 525/903; 522/121; 522/142; 522/182
(58) Field of Search .................. 525/903, 131, 525/454, 457, 453, 122, 227, 121; 522/121, 142, 182

(56) References Cited

U.S. PATENT DOCUMENTS

| | | | |
|---|---|---|---|
| 3,152,162 A | 10/1964 | Fischer et al. .............. 260/453 |
| 3,253,146 A | 5/1966 | DeVries ........................ 250/71 |
| 3,277,138 A | 10/1966 | Holtschmidt et al. ....... 260/453 |
| 3,396,164 A | 8/1968 | Teotino et al. .............. 260/244 |
| 3,454,606 A | 7/1969 | Brotherton et al. ...... 260/397.7 |
| 3,455,883 A | 7/1969 | Kamal et al. .............. 260/77.5 |
| 3,492,330 A | 1/1970 | Trocker et al. ............. 260/453 |
| 3,517,039 A | 6/1970 | Wagner et al. ........... 260/404.5 |
| 3,567,763 A | 3/1971 | Emmons et al. ............ 260/478 |
| 3,654,106 A | 4/1972 | Wagner et al. ......... 204/159.43 |
| 3,664,457 A | 5/1972 | York ............................ 182/70 |
| 4,128,600 A | 12/1978 | Skinner et al. ............. 260/859 |
| 4,250,053 A | 2/1981 | Smith ......................... 252/426 |
| 4,256,828 A | 3/1981 | Smith ......................... 430/280 |
| 4,342,793 A | 8/1982 | Skinner et al. ............... 427/44 |
| 4,677,137 A | 6/1987 | Bany et al. .................... 522/31 |
| 4,684,678 A | 8/1987 | Schultz et al. .............. 523/466 |
| 4,710,536 A | 12/1987 | Klingen et al. ............. 524/493 |
| 4,747,953 A | * 5/1988 | Zupancic et al. ........... 210/651 |
| 4,749,590 A | 6/1988 | Klingen et al. ............. 427/54.1 |
| 4,846,905 A | 7/1989 | Tarbutton et al. ............. 525/65 |
| 4,921,759 A | 5/1990 | Orain et al. ............... 428/424.4 |
| 4,923,934 A | * 5/1990 | Werner ........................ 525/528 |
| 4,950,696 A | 8/1990 | Palazotto et al. ............. 522/25 |
| 4,985,340 A | 1/1991 | Palazzotto et al. .......... 430/270 |
| 5,059,701 A | 10/1991 | Keipert ........................ 556/13 |
| 5,147,900 A | 9/1992 | Palazzotto et al. ............ 522/25 |
| 5,191,101 A | 3/1993 | Palazzotto et al. ............ 556/47 |
| 5,215,860 A | 6/1993 | McCormick et al. ....... 430/270 |
| 5,252,694 A | 10/1993 | Willett et al. ............... 525/404 |
| 5,256,170 A | 10/1993 | Harmer et al. ................ 51/293 |
| 5,326,621 A | 7/1994 | Palazzotto et al. .......... 428/195 |
| 5,360,462 A | 11/1994 | Harmer et al. ................ 51/295 |
| 5,376,428 A | 12/1994 | Palazzotto et al. .......... 428/143 |
| 5,605,761 A | 2/1997 | Burns et al. ................. 428/412 |
| 5,672,643 A | 9/1997 | Burns et al. ................... 524/90 |
| 5,674,622 A | 10/1997 | Burns et al. ................ 428/412 |

FOREIGN PATENT DOCUMENTS

| | | |
|---|---|---|
| DE | 1072385 | 7/1960 |
| EP | 0 273 583 A | 7/1988 |
| GB | 848671 | 9/1960 |
| GB | 874430 | 8/1961 |
| WO | 95 11464 A | 4/1995 |
| WO | 97 12000 A | 4/1997 |

OTHER PUBLICATIONS

*Encyclopedia of Polymer Science and Engineering*, vol. 8; John Wiley & Sons, New York (1987) pp. 279.

L. H. Sperling, *Introduction to Physical Polymer Science*, John Wiley & Sons (1986) pp. 46–47.

D. Klempner, "Interpenetrating Polymer Networks", American Chemical Society, Washington, D.C. (1994).

Akay M et al., "Examination of Glass–Transition In A PU/PMMA Sequential IPN", Polymers at Low Temperatores, London, Engl, 1987, pp. 1–10, XP002091670, 1987 Plastics & Rubber Inst. Engl (see abstract).

* cited by examiner

Primary Examiner—James J. Seidleck
Assistant Examiner—U. K Rajguru
(74) *Attorney, Agent, or Firm*—Phillip Y. Dahl

(57) ABSTRACT

An interpenetrating polymer network (IPN) or semi-interpenetrating polymer network (semi-IPN) comprises a first phase which is continuous and comprises a flexible polymer and a second phase which is a fluorescent or nonfluorescent durable dispersed or continuous phase and comprises a dye and a polymer, wherein the polymer enhances durability of the dye. Such networks are particularly useful in fluorescent traffic signs or safety devices or in pavement marking tape or paint.

7 Claims, No Drawings

ENHANCED DYE DURABILITY THROUGH CONTROLLED DYE ENVIRONMENT

This is a divisional of application Ser. No. 08/957,291 filed Oct. 24, 1997, now U.S. Pat. No. 6,001,936.

FIELD OF THE INVENTION

This invention relates to interpenetrating polymer networks and semi-interpenetrating polymer networks comprising a fluorescent dye or non-fluorescent having enhanced durability.

BACKGROUND OF THE INVENTION

Articles containing colorants are known to lose their color when exposed to solar radiation for extended times. In particular, fluorescent colorants degrade more quickly than conventional colorants, often turning colorless on exposure to daily solar radiation in a matter of days or months. Even though they are less durable, fluorescent dyes are commonly used for increased visibility of an article due to the visual contrast between a dyed article and its surroundings. Increased visibility is particularly important, for instance, in the traffic sign industry. Fluorescent colored signs have been shown to increase motorist and pedestrian safety, but their use remains limited due to their poor color stability and the need to frequently replace them in order to maintain effective performance.

Attempts to maintain color of fluorescent articles have included adding ultraviolet (UV) overlay screens which effectively filter radiation below 380 nm. Such protective overlays add cost and complexity to otherwise low-maintenance articles. Hindered amine light stabilizers (HALS) have been added to polycarbonate matrixes to enhance the durability of fluorescent dyes contained therein.

Interpenetrating polymer networks (IPNs), systems comprising two independent crosslinked polymer networks, have been described. See, for example, *Encyclopedia of Polymer Science and Engineering* Vol. 8; John Wiley & Sons, New York (1987) p. 279 and L. H. Sperling, *Introduction to Physical Polymer Science,* John Wiley & Sons (1986) pp. 46–47. In particular, IPNs comprising acrylate and urethane networks have been prepared by either sequential or simultaneous (but independent) polymerization of free-radically polymerizable ethylenically-unsaturated acrylate-type monomers and urethane precursors (i.e., polyisocyanate and polyhydroxy coreactants). See, for example, U.S. Pat. Nos. 4,128,600, 4,342,793, 4,921,759, 4,950,696, 4,985,340, 5,147,900, 5,256,170, 5,326,621, 5,360,462, and 5,376,428.

Single phase polymers comprising pigments or dyes have been disclosed. See, for example, U.S. Pat. Nos. 3,253,146, 5,605,761, and 5,672,643.

SUMMARY OF THE INVENTION

Briefly, the present invention provides an interpenetrating polymer network (IPN) or semi-interpenetrating polymer network (semi-IPN) comprising
 a) a first phase being a continuous phase and comprising a flexible polymer, and
 b) a second phase being a fluorescently durable dispersed or continuous phase and comprising a fluorescent dye and a polymer, wherein the polymer enhances durability of the fluorescent dye.

Preferably the polymer of the first phase has a Tg of at most 40° C., preferably at most 30° C. to impart flexibility of the IPN or semi-IPN under use conditions.

In another aspect, the present invention provides a multilayer construction comprising a substrate having on at least one surface thereof a substantially transparent fluorescent layer, the multilayer construction being a pavement marking tape.

In yet another aspect, this invention relates to an IPN or semi-IPN in which a conventional dye replaces the fluorescent dye described above.

In still a further aspect, this invention provides a method of enhancing the color durability of a fluorescent or non-fluorescent dye in an IPN or semi-IPN comprising the step of:
 providing an IPN or semi-IPN comprising:
  a first phase being a continuous phase and comprising a flexible polymer, and
  a second phase being a durable colored dispersed or continuous phase comprising a dye therein, wherein the polymer enhances durability of the dye.

In the present invention, the mechanical properties of the IPN or semi-IPN are controlled by the first phase polymer, and the local environment of the dye is controlled by the second phase. This provides the advantage of optimizing the mechanical properties, such as flexibility, conformability, abrasion-resistance, and toughness, and the dye environment independently of one another.

A dye can be covalently bound to the polymer in the second phase, or it can be soluble in the polymer of the second phase. Preferably, it is covalently bound to the polymer of the second phase.

In this application:
 "acrylate" means acrylic and methacrylic acid and esters thereof;
 "conventional colorant" means colorants which do not exhibit fluorescent properties to the unaided eye;
 "dye" means a colorant that can be dissolved in the matrix in which it resides;
 "flexible" means capable of bending around a mandrel of 3 mm diameter without cracking at 23° C.;
 "fluorescent dye" means a compound that exhibits fluorescent properties to the unaided eye;
 "fluorescently durable" means enhanced retention of fluorescence relative to a single phase system upon exposure to weathering;
 "group" or "compound" or "ligand" or "monomer" or "polymer" means a chemical species that allows for substitution or which may be substituted by conventional substitutents which do not interfere with the desired product; e.g., substitutents can be alkyl, alkoxy, aryl, phenyl, halo (F, Cl, Br, I), cyano, nitro, etc.;
 "hindered amine light stabilizer" means sterically hindered amines of the class of compounds preferably represented by 2,2,6,6-tetraalkyl piperidines;
 "interpenetrating polymer network" means a network of two or more polymers (two phases) that is formed by independent polymerization of two or more monomers in the presence of each other so that the resulting independent crosslinked polymer networks are physically intertwined but are essentially free of chemical bonds between them; there is produced an entangled combination of two crosslinked polymers that are not bonded to each other;
 "organometallic compound" means a chemical substance in which at least one carbon atom of an organic group is bonded to a metal atom (*Basic Inorganic Chemistry,* F. A. Cotton, G. Wilkinson, Wiley, N.Y., 1976, p. 497); and "metal" means any transition metal from Periodic Groups 4–10;
 "semi-interpenetrating polymer network" means a polymer network of two or more polymers that is formed by independent polymerization of two or more monomers so that the polymers (two phases) are independent but are physically intertwined and are essentially free of chemical bonds between them and wherein at least one polymer is crosslinked, i.e., thermoset, and at least one is uncrosslinked, i.e., thermoplastic; there is produced an entangled combination of two polymers, one of which is crosslinked, that are not bonded to each other; and "weathering" means exposing an article to either natural or artificial environments which include heat, moisture, and radiation.

There is a continuing need for articles that exhibit enhanced fluorescence and color durability. In particular, fluorescent articles that retain their color and/or fluorescent properties out of doors without requiring, e.g., protective overlays, are needed.

A desire for flexible fluorescent products has led to work in polyvinylchloride, olefin copolymers and polyurethanes. Unfortunately, when these resins are employed as hosts for fluorescent dyes, poor color retention results. Factors contributing to the reduction in color include lack of dye solubility in the host matrix, dye migration, and minimal protection offered by the resin against photodegradation.

Dispersal of a second phase, preferably an acrylate phase, more preferably an aromatic acrylate phase, into these thermoplastic resins reduces the above mentioned drawbacks. Preferably, it provides for the covalent attachment of the fluorescent dye, thus preventing physical loss of the dye and provides a protective environment for the dye against photodegradation.

IPNs or semi-IPNs can include polymers that can comprise as a first phase any of crosslinked and/or thermoplastic polyurethanes, polyolefins, copolymers of olefins preferably with acrylates, block copolymers, polyvinyl chloride, natural and synthetic rubbers, as well as silicone rubber, and fluoroelastomers.

The second phase of the IPNs and semi-IPNs of the invention, which is the phase that includes a dye, preferably a fluorescent dye, can be a dispersed phase or a continuous phase. Polymers that can comprise the second phase include acrylates, epoxies, and cyanate esters, and preferably comprises an acrylate polymer with aromatic content.

The advantage of this approach is that dye color retention can be improved while maintaining desired physical properties. Depending on the product application, physical properties may include flexibility, strength, transparency or thermoformability. This can be achieved through the use of a two-phase IPN or semi-IPN system where the fluorescent dye preferably is reacted into a crosslinked dispersed second phase in a continuous first phase. Therefore, the continuous first phase dominates the physical properties, and the dispersed second phase serves to anchor the dye and improve photodurability. The advantage lies in the independent optimization of both phases. The first phase can be chosen for a particular physical property while the dispersed second phase can be chosen for enhanced dye photodurability. For instance, accelerated weathering studies have shown that photodurability is improved when the dispersed second phase comprises aromatic components.

Semi-IPNs and IPNs can be prepared by a modified extrusion process amenable to existing product manufacturing. They can be extruded onto liners or onto other webs such as pavement marking tapes. Curing of the dispersed second phase can occur thermally or by radiation curing after desired processing.

Solventless processing is another advantage of the IPNs and semi-IPNs of the present invention. For example, with IPNs comprising urethanes and acrylates, the acrylate monomers act as reactive diluents such that no solvents are needed to obtain a coatable viscosity. Additionally, IPNs and semi-IPNs offer several cure options. In the case of IPNs, monomers can be polymerized simultaneously or the monomers can be polymerized sequentially in either order. An advantage of sequential polymerizations is that after one of the phases is cured, the sample can undergo additional processing before the second phase is cured. This sequence is typical of IPN processing. In addition, many polymerizations can be initiated by different methods, such as thermal or radiation cure of acrylates. Therefore, numerous processing options can be identified for each IPN or semi-IPN system.

IPNs and semi-IPNs of the present invention find use as fibers, fabrics, canvas markings, roll-up signs, barrel wraps, cone sleeves, truck markings, license plates, safety vests, pavement marking paints and tapes, reflective films, and other articles where flexible materials having dye durability are desired. These materials preferably are fluorescent. The materials of the present invention are particularly useful in safety applications and devices, such as in fluorescent traffic signs, where dye stability and durability is highly valued.

IPNs and semi-IPNs of the present invention are superior to known materials because there is produced a flexible article which not only provides a mechanism for covalent dye attachment, but also retards dye degradation. Preferred IPNs and semi-IPNs are transparent so as not to interfere with optical properties of the article.

DETAILED DESCRIPTION OF PREFERRED EMBODIMENTS

IPNs and semi-IPNs of the present invention comprise a first phase which is a continuous phase and to a great extent contributes mechanical properties, including flexibility, to the final network. Polymers that can comprise the first phase include crosslinked and/or thermoplastic polyurethanes, polyolefins, copolymers of olefins preferably with acrylates, polyvinyl chloride, block copolymers, natural and synthetic rubbers, as well as silicone rubber, and fluoroelastomers. Preferably, the first phase is present in an amount by weight that is greater than that of the second phase, i.e., greater than 50 weight percent of the IPN or semi-IPN.

The second phase of the IPNs and semi-IPNs of the invention, which is the phase that includes a dye, which preferably is a fluorescent dye, can be a dispersed phase or a continuous phase. Polymers that can comprise the second phase include acrylates, epoxies, and cyanate esters, and preferably comprises an acrylate polymer with aromatic content. Preferably, the network of the second phase is present in an amount by weight that is less than that of the first phase, i.e., less than 50 percent by weight. Preferably, the polymer of the second phase has aromatic content and is crosslinked.

Preferred IPNs of the invention include those wherein the first phase is a polyurethane that is formed by a condensation reaction between an isocyanate and an alcohol, and wherein the second phase is an acrylate network formed by free radical chain polymerization of one or more acrylate monomers. The resulting networks are held together by permanent entanglements.

Preferred semi-IPNs of the invention include those wherein the first phase is a commercially available thermoplastic polyolefin copolymer, and wherein the second phase is an acrylate network formed by free radical chain polymerization of one or more acrylate monomers.

Morphology of the IPN or semi-IPN can be controlled, for example, by utilizing compatibilizing agents that promote chemical or physical interactions between the phases. Representative examples include hydroxy-functional acrylates, diol-functional acrylates, amine-functional acrylates, hydroxy-functional epoxies, and block copolymers, as is known in the art.

IPNs and semi-IPNs of the present invention are prepared by methods known in the art. See, for example, D. Klempner, Editor, "Interpenetrating Polymer Networks", American Chemical Society, Washington, D.C. (1994).

The IPNs of the present invention can be prepared by simultaneous cure of a mixture of acrylate monomer(s) via free-radical polymerization and urethane precursors, namely polyisocyanates and polyfunctional alcohols, via condensation polymerization.

All components, used in the present invention, unless otherwise stated, are either commercially available or can be prepared by methods known in the art.

A wide variety of acrylate monomers and/or oligomers can be used in preparing the second phase of the IPN or semi-IPN of the invention, including mono-, di-, and polyacrylates and -methacrylates, such as methyl acrylate, methyl methacrylate, ethyl acrylate, isopropyl methacrylate, isooctyl acrylate, n-hexyl acrylate, 2-ethylhexyl acrylate, stearyl acrylate, isobornyl acrylate, tetrahydrofurfuryl acrylate, perfluorinated octyl acrylate, caprolactone acrylate, allyl acrylate, glycerol diacrylate, ethylene glycol diacrylate, diethylene glycol diacrylate, triethylene glycol dimethacrylate, 1,3-propanediol diacrylate, 1,3-propanediol dimethacrylate, 1,6-hexanediol diacrylate, 1,8-hexanediol diacrylate, neopentyl glycol diacrylate, 1,4-cyclohexanediol diacrylate, propoxylated neopentyl glycol diacrylate, glycerol triacrylate, trimethylolpropane triacrylate, 1,2,4-butanetriol trimethacrylate, pentaerythritol triacrylate, pentaerythritol tetraacrylate and -tetramethacrylate, sorbitol hexaacrylate, bis[1-(2-acryloxy)]-p-ethoxyphenyl dimethylmethane, bis[1-(3-acryloxy-2-hydroxy)]-p-propoxyphenyl dimethylmethane, tris-hydroxyethylisocyanurate trimethacrylate, bis-acrylates and bis-methacrylates of polyalkylene glycols, and combinations thereof. Acrylate monomers having aromatic content include benzyl acrylate, phenoxyethyl acrylate, phenoxyethyl methacrylate, tribromophenoxyethyl acrylate, ethoxylated bisphenol A diacrylate, bisphenol A dimethacrylate, and (2-phenylthio)ethyl acrylate. Preferred acrylates include the above named aromatic acrylates.

Preferably, a combination of a monofunctional acrylate or methacrylate and a polyfunctional, preferably difunctional, acrylate or methacrylate, is used in the IPNs or semi-IPNs of the invention. The monofunctional acrylate or methacrylate monomer(s) may be selected from the group consisting of isooctyl acrylate, tetrahydrofurfuryl acrylate, phenoxyethyl acrylate, isobornyl acrylate, perfluorinated octyl acrylate, caprolactone acrylate, and combinations thereof. The polyfunctional acrylate or methacrylate monomer(s) may be selected from the group consisting of propoxylated neopentyl glycol diacrylate, 1,6-hexanediol diacrylate, 1,3-propanediol diacrylate, trimethylolpropane triacrylate, ethoxylated bisphenol A diacrylate, and combinations thereof.

Thermal initiators useful in preparing acrylates included in the IPNs or semi-IPNs comprise, but are not limited to, azo, peroxide, persulfate and redox initiators.

Suitable azo initiators include, but are not limited to, 2,2'-azobis(4-methoxy-2,4-dimethylvaleronitrile) (VAZO™ 33), 2,2'-azobis(2-amidinopropane) dihydrochloride (VAZO™ 50), 2,2'-azobis(2,4-dimethylvaleronitrile) (VAZO™ 52), 2,2'-azobis(isobutyronitrile) (VAZO™ 64), 2,2'-azobis(2-methylbutyronitrile) (VAZO™ 67), and 1,1'-azobis(1-cyclohexanecarbonitrile) (VAZO™ 88), all of which are available from DuPont Chemicals, Wilmington, Del., and 2,2'-azobis(methyl isobutyrate) (V-601™), available from Wako Chemicals USA Inc., Richmond, Va.

Suitable peroxide initiators include, but are not limited to, benzoyl peroxide, acetyl peroxide, lauryl peroxide, decanoyl peroxide, diacetyl peroxydicarbonate, di(4-t-butylcyclohexyl)peroxydicarbonate (PERKADOX™ 16), available from Akzo, Nobel Chemicals, Inc., Chicago, Ill., di(2-ethylhexyl)peroxydicarbonate, t-butylperoxypivalate (Lupersol™ 11), available from Elf Atochem North America, Philadelphia, Pa., t-butylperoxy-2-ethylhexanoate (Trigonox™ 21 -C50), available from Akzo, Nobel Chemicals, Inc., and dicumyl peroxide.

Suitable persulfate initiators include, but are not limited to, potassium persulfate, sodium persulfate, and ammonium persulfate.

Suitable redox (oxidation-reduction) initiators include, but are not limited to, combinations of the above persulfate initiators with reducing agents such as sodium metabisulfite and sodium bisulfite; systems based upon organic peroxides and tertiary amines, such as benzoyl peroxide plus dimethylaniline; and systems based on organic hydroperoxides and transition metals, such as cumene hydroperoxide plus cobalt naphthenate.

Other initiators include, but are not limited to, pinacols, such as teteraphenyl-1,1,2,2-ethanediol.

Preferred thermal free radical initiators are selected from the group consisting of azo compounds and peroxides. Most preferred are benzoyl peroxide, Lupersol™ 11, and Perkadox™ 16, and combinations thereof.

The initiator is present in a catalytically-effective amount and such amounts are typically in the range of from about 0.01 to about 5 percent by weight, and preferably in the range of from about 0.025 to about 2 percent by weight, based on the weight of the total IPN or semi-IPN formulation. If a mixture of initiators is used, the total amount of the mixture of initiators would be as if a single initiator was used.

Photoinitiators that are useful for polymerizing acrylate monomers include the benzoin ethers, such as benzoin methyl ether or benzoin isopropyl ether; substituted benzoin ethers, such as anisoin methyl ether; substituted acetophenones, such as 2,2-diethoxyacetophenone and 2,2-dimethoxy-2-phenylacetophenone; substituted alpha-ketols, such as 2-methyl-2-hydroxypropiophenone; aromatic sulfonyl chlorides, such as 2-naphthalene-sulfonyl chloride; bis-acyl phosphine oxides, such as bis-(2,6-dimethoxybenzoyl)-2,4,4-trimethylpentylphosphine oxide and 2,4,6-trimethylbenzoyl diphenyl phosphine oxide; photoactive oximes, such as 1-phenyl-1,1-propanedione-2-(o-ethoxycarbonyl)oxime; and mixtures thereof They may be used in amounts, which as dissolved provide about 0.01 to about 5 percent by weight of the acrylate monomer, preferably in the range of about 0.25 to about 2 percent by weight of the total IPN formulations. If a mixture of initiators is used, the total amount of the mixture of initiators would be as if a single initiator was used.

Optionally, it is within the scope of this invention to include photosensitizers or photoaccelerators in the radiation-sensitive compositions. Use of photosensitizers or photoaccelerators alters the wavelength sensitivity of radiation-sensitive compositions employed as initiators of this invention. This is particularly advantageous when the initiator does not strongly absorb the incident radiation. Use of a photosensitizer or photoaccelerator increases the radiation sensitivity allowing shorter exposure times and/or use of less powerful sources of radiation. Any photosensitizer or photoaccelerator may be useful if its triplet energy is at least 45 kilocalories per mole. Examples of such photosensitizers are given in Table 2-1 of the reference, S. L. Murov, *Handbook of Photochemistry*, Marcel Dekker Inc., N.Y., 27–35 (1973), and include pyrene, fluoranthrene, xanthone, thioxanthone, benzophenone, acetophenone, benzil, benzoin and ethers of benzoin, chrysene, p-terphenyl, acenaphthene, naphthalene, phenanthrene, biphenyl, substituted derivatives of the preceding compounds, and the like. When present, the amount of photosensitizer or photoaccelerator used in the practice of the present invention is generally in the range of 0.01 to 10 parts, and preferably 0.1 to 1.0 parts, by weight of photosensitizer or photoaccelerator per part of initiator.

The polyisocyanate component of the polyurethane precursors useful in the practice of the present invention may be any aliphatic, cycloaliphatic, aromatic or heterocyclic polyisocyanate, or any combination of such polyisocyanates. Particularly suitable polyisocyanates correspond to the formula $$Q(NCO)_p \qquad (I)$$

in which p is an integer of from 2 to 4; and

Q represents:
  an aliphatic hydrocarbon di-, tri-, or tetra-radical containing from 2 to 100 carbon atoms and zero to 50 heteroatoms;
  a cycloaliphatic hydrocarbon radical containing from 4 to 100 carbon atoms and zero to 50 heteroatoms;
  an aromatic hydrocarbon radical or heterocyclic aromatic radical containing from 5 to 15 carbon atoms and zero to 10 heteroatoms; or
  an araliphatic hydrocarbon radical containing from 8 to 100 carbon atoms and zero to 50 heteroatoms. The heteroatoms that can be present in Q include non-peroxidic oxygen, sulfur, non-amino nitrogen, halogen, silicon, and non-phosphino phosphorous.

Examples of polyisocyanates are as follows: ethylene diisocyanate, 1,4-tetramethylene diisocyanate, 1,6-hexamethylene diisocyanate, trimethyl hexamethylene diisocyanate, 1,12-dodecane diisocyanate, cyclobutane-1,3-diisocyanate, cyclohexane-1,3- and -1,4-diisocyanate, 1-isocyanato-3,3,5-trimethyl-5-isocyanotomethylcyclohexane (isophorone diisocyanate, IDPI), 2,4-and 2,6-hexahydrotolylene diisocyanate, perhydro-2,4'- and -4,4'-diphenylmethane diisocyanate ($H_{12}MDI$), hexahydro-1,3- and -1,4-phenylene diisocyanate, 1,3- and -1,4-phenylene diisocyanate, 2,4- and 2,6-tolylene diisocyanate, diphenylmethane-2,4'- and -4,4'-diisocyanate, mixtures of 2,2,4-and 2,4,4-trimethyl hexamethylene diisocyanate (TMDI), naphthylene-1,5-diisocyanate, including mixtures of these isomers, as well as oligomers thereof, and any combination of the above diisocyanates.

IPNs or semi-IPNs of the invention can also be prepared using, for example, triphenylmethane-4,4',4"-triisocyanate, polyphenyl polymethylene polyisocyanates (British Patent Nos. 874,430 and 848,671); m- and p-isocyanatophenyl sulfonyl isocyanates (U.S. Pat. No. 3,454,606); perchlorinated aryl polyisocyanates (U.S. Pat. No. 3,227,138); polyisocyanates containing carbodiimide groups (U.S. Pat. No. 3,152,162); norbornane diisocyanates (U.S. Pat. No. 3,492,330); polyisocyanates containing allophanate groups (such as DESMODUR XP 7040™, available from Bayer Chemicals, Pittsburgh, Pa.); polyisocyanates containing isocyanurate groups (such as DESMODUR N-3300™, available from Bayer Chemicals); polyisocyanates containing urethane groups (U.S. Pat. Nos. 3,396,164 and 3,664,457); polyisocyanates containing acrylated urea groups (German Patent No. 1,230,778); polyisocyanates containing biuret groups (such as DESMODUR N-100™, available from Bayer Chemicals); polyisocyanates produced by telomerization reactions (U.S. Pat. No. 3,654,106); polyisocyanates containing ester groups (U.S. Pat. No. 3,567,763); polyisocyanates prepared from the reaction of any of the above-mentioned diisocyanates with acetals (German Patent No. 1,072,385) and polyisocyanates containing polymeric fatty acid esters (U.S. Pat. No. 3,455,883).

Preferred polyisocyanates for use in films of the invention include Desmodur N-100™, Desmodur XP 7040E™, Desmodur N-3300™ and combinations thereof.

Suitable co-reactants with polyisocyanates for formation of the polyurethane component of the IPN or semi-IPN are compounds containing one or more reactive hydroxyl groups, particularly compounds containing from about 2 to about 50 hydroxyl groups and above all, compounds having a weight average molecular weight of from about 50 to about 25000, preferably from about 700 to about 2000. For example, polyesters, polyethers, polythioethers, polyacetals, polycarbonates, poly(meth)acrylates, polyurethanes, and polyester amides containing at least 2, generally 3 or more hydroxyl groups, as well as hydroxyl-containing prepolymers of these compounds reacted with a less-than-equivalent quantity of polyisocyanates (of the type known for production of polyurethanes) can be used in the present invention.

Co-reactants with polyisocyanates can also include compounds containing one or more reactive amine groups, such as, for example, XP-7053™, XP-7059™ and XP-7068™ aspartic esters (available from Bayer Corp., Pittsburgh, Pa.).

Low molecular weight compounds containing at least two isocyanate-reactive hydrogen atoms (molecular weight of from about 50 to about 400) suitable for use in accordance with the present invention are compounds preferably containing hydroxyl groups and generally containing from 2 to about 8, and preferably from 2 to about 4 isocyanate reactive hydrogen atoms. Combinations of different compounds containing at least two isocyanate-reactive hydrogen atoms and having a molecular weight in the range of from about 50 to about 400 can also be used. Examples of such compounds include ethylene glycol, 1,2- and 1,3-propane diol, 1,2-, 1,3-, 1,4- and 2,3-butane diol, 1,5-pentane diol, 1,6-hexane diol, 1,8-octane diol, neopentyl glycol, 1,4-bishydroxymethyl cyclohexane (1,4-cyclohexane dimethanol), 2-methyl-1,3-propane diol, dibromobutene diol, glycerol, trimethylolpropane, 1,2,6-hexanetriol, 2,2-dimethyl-1,3-propane diol, 1,6- and 2,5-hexane diol, 1,12-dodecane diol, 1,12- and 1,1 8-octadecane diol, 2,2,4- and 2,4,4-trimethyl-1,6-hexane diol, trimethylol propane, cyclohexane-1,4-diol, 2,2-bis-(4-hydroxycyclohexyl)-propane, 1,4-bis-(ω-hydroxyethoxy)-benzene, 1,3-bis-hydroxyalkyl hydantoins, tris-hydroxyalkyl isocyanurates and tris-hydroxyalkyl-triazolidane-3,5-diones, trimethylolethane, pentaerythritol, quinitol, mannitol, sorbitol, diethylene glycol, triethylene glycol, tetraethylene glycol, dipropylene glycol, higher polypropylene glycols, higher polyethylene glycols, higher polybutylene glycols, and combinations thereof.

Higher molecular weight polyols include the polyethylene and polypropylene oxide polymers in the molecular weight range of from about 200 to about 20,000, such as the Carbowax™ 400, 600, 800, 1000, 3350, 8000 and 20000 series of poly(ethylene oxide) compounds (available from Union Carbide Corp., Danbury, Conn.), caprolactone polyols in the molecular weight range of from about 200 to about 5000, such as the Tone™ 200, 210, 230, 240, 260, 301, 305, and 310 series of polyols (available from Union Carbide), poly(tetramethylene ether) glycols in the molecular weight range of from about 200 to about 4000, such as the Terathane™ 1000 and 2000 series of polyols (available from DuPont Co., Wilmington, Del.), hydroxy-terminated polybutadiene materials, such as the Poly bd™ series of polyols (available from Elf Atochem, Philadelphia, Pa.), polycarbonate diols, such as KM-10-1667™ and KM-10-1733™ (available from Stahl USA, Peabody, Mass.), polyurethane diols, such as K-flex UD-320-100™ (available from King Industries, Norwalk, Conn.), aromatic polyether polyols, such as Synfac 8024™ (available from Milliken Chemical, Spartanburg, S.C.), and random copolymers of poly (tetramethylene oxide)/polycarbonate, such as the Poly-THF™ CD series of polyols (available from BASF Corporation, Mount Olive, N.J.). Preferred polyester polyols include the Desmophen™ family (available from Bayer, Pittsburgh, Pa., as Desmophen™ 670-80, 670-100, 800, and 1100). A preferred acrylic polyol is Joncryl™ 587 (commercially available from S. C. Johnson & Son, Inc., Racine, Wis.).

Another group of preferred polyols consists of hydroxyalkylated bisphenol derivatives. Preferred polyols in this group have the following general formula:

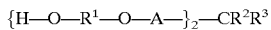

wherein $R^1$ is either a straight or branched or cyclic alkylene (e.g., methylene, ethylene, butylene, decylene) group consisting of 1 to 10 carbon atoms, or an aralkylene group consisting of 7 to 14 carbon atoms (e.g., benzylidene, 1,2-diphenylethylene, phenethylene); $R^2$ and $R^3$ independently may be an alkyl group, aralkyl group, cycloalkyl group, alkaryl group, or an aryl group of from 1 to about 30 carbon atoms (preferably methyl, ethyl, and trifluoromethyl) and none or from 1 to about 10 heteroatoms, and $R^2$ and $R^3$ together can comprise an alkylene, cycloalkylene, arylene, alkarylene or aralkylene group containing from 2 to about 660 carbon atoms and none or from 1 to about 10 heteroatoms such as O and N;

A can be a substituted or unsubstituted arylene group, preferably having from 6 to about 12 carbon atoms, most preferably p-phenylene, o-phenylene or dimethylnaphthalene.

Specific preferred hydroxyalkylated bisphenols include 9,9-bis-4-(2-hydroxyethoxyphenyl)fluorene (i.e., hydroxyethylated bisphenol of fluorenone), 2,2-bis-4-(2-hydroxyethoxyphenyl)butane (i.e., hydroxyethylated bisphenol of 2-butanone), 2,2-bis-4-(2-hydroxyethoxyphenyl)hexafluoropropane (i.e., hydroxyethylated bisphenol F), 2,2-bis-4-(2-hydroxyethoxyphenyl) propane, 2,2-bis-4-(2-hydroxyethoxyphenyl)norbornane, 2,2-bis-4-(2-hydroxyethoxyphenyl)-5,6-cyclopentanonorbornane, and 1,1-bis-4-(2-hydroxyethoxyphenyl)cyclohexane.

Other polyols suitable for use in the production of the polyurethanes and epoxy resins useful in the invention are the hydroxyalkyl ethers obtained by the addition of optionally substituted alkylene oxides, such as ethylene oxide, propylene oxide, butylene oxide and styrene oxide, onto the above-mentioned polyols.

Preferred examples of such polyols are diethylene glycol, triethylene glycol, dipropylene glycol, tripropylene glycol, dibutylene glycol, 1,4-bis-(2-hydroxyethoxy)cyclohexane, 1,4-bis-(2-hydroxyethoxy-methyl)-cyclohexane, 1,4-bis-(2-hydroxyethoxy)-benzene, 4,4'-bis-(2-hydroxyethoxy)-diphenylmethane, -diphenylpropane, -diphenyl ether, -diphenyl sulphone, -diphenyl ketone and -diphenyl cyclohexane.

It is, of course, possible to use combinations of the above-mentioned compounds containing at least two isocyanate-reactive hydrogen atoms and having a molecular weight of from about 50 to about 50000, e.g., combinations of polyethers and polyesters.

Many other compounds containing isocyanate-reactive hydrogen atoms (e.g., amines) and polyisocyanates are useful in the present invention, as would be obvious to one skilled in the art.

Preferably, the hydroxyl-functional material is at least a diol and is present in an amount sufficient to provide an isocyanate-to-polyol ratio in the composition preferably between about 1.1:1 and 0.9:1.

Catalysts for polyurethane formation are known, typically including certain tertiary amines, salts of weak acids, and certain organometallic compounds. While any of the known thermally-activatable catalysts can be used in preparing the polyurethane component of the inventive IPN or semi-IPN, the metal salts of weak organic acids are preferred. Among these may be named dibutyltin dilaurate and tin octoate. Most preferred is dibutyltin dilaurate, for reasons of high catalytic activity, availability, and low cost.

Thermoplastic homopolymeric polyolefins useful in the first phase of the IPN or semi-IPN of the present invention include polyethylene, polypropylene, poly-1-butene, poly-1-pentene, poly-1-hexene, poly-1-octene and related polyolefins. Useful homopolymeric polyolefins include polyethylene (e.g., Dow LDPE 4012™, available from Dow Chemical Co., Midland, Mich.). Also useful are copolymers of alpha-olefins, including poly(ethylene-co-propylene) (e.g., SRD7-462™, SRD7-463™ and DS7C50™, each of which is available from Shell Chemicals, Inc., Houston, Tex.), poly(propylene-co-1-butene) (e.g., SRD6-328™, also available from Shell Chemicals), and related copolymers. Useful copolymers are poly(ethylene-co-propylene). Also useful is the Vestoplast™ series of polyolefins, available from Huls America Inc., Piscataway, N.J.

Thermoplastic copolymers of olefins and acrylates that are useful in the first phase of the IPN or semi-IPN of the present invention include ethylene-methacrylic acid copolymer (Nucrel™ 699 and Surlyn™ 1706, E. I. DuPont, Wilmington, Del.), ethylene acrylic acid copolymer (Primacor™ 3440, Dow Chemical Company, Midland, Mich.), and ethylene copolymer of methacrylic acid and isobutyl acrylate (E. I. DuPont, Wilmington, Del.).

Thermoplastic polyurethanes are useful in the first phase of the invention and can include both aliphatic and aromatic polyurethanes with polyester, polycarbonate, polycaprolactone or polyether based polyols. Examples of polyester based aromatic polyurethanes include Morthane™ CA9068-201, PS455-100, PS49-202, PS79-200, and CA101-200; examples of polycaprolactone based aromatic polyurethanes include Morthane™ CP91-400, PC86-400 and PC75-400; and examples of polyether based aromatic polyurethanes include Morthane™ PE90-200, PE88-204, PE889A-0205 and CA888. Examples of polyester based aliphatic polyurethanes include Morthane™ PN3429-219, PN03-214, L424-167, and PN343-200 and examples of polyether based aliphatic polyurethanes include Morthane™ PE193-100, PE192-100, PE299-100 and PE399-100. All of the above mentioned polyurethanes are available from Morton International, Inc. (Chicago, Ill.).

Block copolymers are another class of polymers useful in the first phase of the invention. Block copolymers are characterized by alternating blocks of different monomer compositions along the polymeric backbone. The alternating blocks could be arranged in a simple diblock fashion, where 2 polymers of different chemistries are linked together at one terminus, or in a triblock fashion where 3 polymers of different chemistries could be linked together in a sequential fashion or 2 polymers of the same chemical composition are linked to the 2 terminal ends of a polymer with a different chemical composition. In this fashion, block copolymers of infinite block chemistries and sequences can be envisioned. Repeating sequences of blocks along a polymer chain can also be envisioned. Allport and Janes review numerous block copolymer chemistries which may be useful in the present invention (Block Copolymers, D. C. Allport, W. H. Janes, Wiley, New York, 1973). Examples of block copolymer chemistries useful in the invention include vinyl block copolymers as exemplified by styrene-isoprene-styrene triblock copolymers or styrene-butadiene-styrene triblock copolymers (Kraton D™ series of polymers, Shell Chemical Co., Naperville, Ill.), styrene-ethylene/butylene-styrene or styrene-ethylene/propylene-styrene triblock copolymers (Kraton G™ series, Shell Chemical Co., Naperville, Ill.), poly(ether-ester) copolymers (Hytrel™ series, DuPont, Wilmington, Del.), poly(ester-amide) copolymers (Elvamide™ series, DuPont Co., Wilmington, Del. or Ultramide™ series, BASF, West Germany), and poly(ether-amide) copolymers (PEBAX™ series, Atochem, Paris, France).

Thermoplastic plasticized polyvinyl chloride is useful in the first phase of the invention. Flexible polyvinyl chloride useful in the invention include materials available from Alpha Gary (Alpha Chemical and Plastics Corporation, Pineville, N.C.) including grades such as 495-85, 2105FR-76, 2222N-78, 30006/E1-74, 3012/1-60, 2214-75, and S00354. Other commercially available flexible polyvinyl chloride suitable for use in the invention can be obtained from Teknor Apex (Teknor Apex Co., Plastics Div., Pawtucket, R.I.) including grades Ultra™ 90-U656C-80 and 3500-70NT™, and from Geon Co. (Avon Lake, Ohio) including grades A-7000, A-5500, A-8500, A5D00, and A-8000 which are known under the tradename Geon™.

Thermosettable epoxy resins useful in the practice of the present invention preferably comprise compounds which contain one or more 1,2-, 1,3-and 1,4-cyclic ethers, which also may be known as 1,2-, 1,3- and 1,4-epoxides. The 1,2-cyclic ethers are preferred. Such compounds can be saturated or unsaturated, aliphatic, alicyclic, aromatic or heterocyclic, or can comprise combinations thereof. Compounds that contain more than one epoxy group (i.e., polyepoxides) are preferred.

Aromatic polyepoxides (i.e., compounds containing at least one aromatic ring structure, e.g., a benzene ring, and more than one epoxy group) that can be used in the present invention include the polyglycidyl ethers of polyhydric phenols, such as Bisphenol A-type resins and their derivatives, epoxy cresol-novolac resins, Bisphenol-F resins and their derivatives, and epoxy phenol-novolac resins; and glycidyl esters of aromatic carboxylic acids, e.g., phthalic acid diglycidyl ester, isophthalic acid diglycidyl ester, trimellitic anhydride trigylcidyl ester, and pyromellitic acid tetraglycidyl ester, and mixtures thereof. Preferred aromatic polyepoxides are the polyglycidyl ethers of polyhydric phenols, such as the EPON™ series of diglycidyl ethers of Bisphenol-A, including EPON 828 and EPON 1001F, available commercially from Shell Chemicals, Inc., Houston, Tex.

Representative aliphatic cyclic polyepoxides (i.e., cyclic compounds containing one or more saturated carbocyclic rings and more than one epoxy group, also known as alicyclic compounds) useful in the present invention include the "ERL™" series of alicyclic epoxides commercially available from Union Carbide Corp., Danbury, Conn., such as vinyl cyclohexene dioxide (ERL-4206), 3,4-epoxycyclohexylmethyl-3,4-epoxycyclohexane carboxylate (ERL-4221), 3,4-epoxy-6-methylcyclohexylmethyl-3,4-epoxy-6-methylcyclohexane carboxylate (ERL-4201), bis(3,4-epoxy-6-methylcycylohexylmethyl)adipate (ERL-4289), dipentene dioxide (ERL-4269), as well as 2-(3,4-epoxycyclohexyl-5,1"-spiro-3",4"-epoxycyclohexane-1,3-dioxane, 4-(1,2-epoxyethyl)-1,2-epoxycyclohexane and 2,2-bis(3,4-epoxycyclohexyl)propane. Preferred alicyclic polyepoxides are the ERL™ series. Other commercially available cycloaliphatic epoxies that are useful in the present invention include vinyl cyclohexene monoxide (Union Carbide Corp.), cyclohexene oxide (Aldrich Chemical Co., Milwaukee, Wis.), vinyl cyclohexene dioxide (ERL 4206™, Union Carbide Corp.), and limonene oxide, limonene dioxide, and $\alpha$-pinene oxide (these three being available from Elf Atochem, Philadelphia, Pa.).

Representative aliphatic polyepoxides (i.e., compounds containing no carbocyclic rings and more than one epoxy group) include 1,4-bis(2,3-epoxypropoxy)butane, polyglycidyl ethers of aliphatic polyols such as glycerol, polypropylene glycol, 1,4-butanediol, and the like, and the diglycidyl ester of linoleic dimer acid.

A wide variety of commercial epoxy resins are available and are listed or described in, e.g., the *Handbook of Epoxy Resins*, by Lee and Neville, McGraw-Hill Book Co., New York (1967), *Epoxy Resins, Chemistry and Technology*, Second Edition, C. May, ed., Marcell Decker, Inc., New York (1988), and *Epoxy Resin Technology*, P. F. Bruins, ed., Interscience Publishers, New York, (1968). Any of the epoxy resins described therein may be useful in preparation of the IPNs and semi-IPNs of the invention.

Polyhydroxy compounds (e.g., "polyols"), as described above, can be useful in the preparation of epoxy resins used in the invention.

It is within the scope of the present invention to include, as a bireactive comonomer, compounds having, for example, both epoxy functionality and at least one other chemical functionality, such as, e.g., hydroxyl, acrylate, ethylenic unsaturation, carboxylic acid, carboxylic acid ester, and the like. An example of such a monomer is Ebecryl™ 3605, commercially available from UCB Radcure, Inc., Atlanta, Ga., a bisphenol-A-type monomer having both epoxy and acrylate functionality.

Epoxy curatives of the present invention can be photo-catalysts or thermal curing agents.

Catalysts of the present invention (also known as "initiators," the terms being used interchangeably in the present invention) preferably can be activated by photochemical means. Known photocatalysts are of two general types: onium salts and cationic organometallic salts, and both are useful in the invention.

Onium salt photoinitiators for cationic polymerizations include iodonium and sulfonium complex salts. Useful aromatic iodonium complex salts are of the general formula:

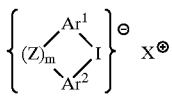

wherein
  $Ar^1$ and $Ar^2$ can be the same or different and are aromatic groups having from 4 to about 20 carbon atoms, and are selected from the group consisting of phenyl, thienyl, furanyl, and pyrazolyl groups;
  Z is selected from the group consisting of oxygen, sulfur, a carbon-carbon bond,

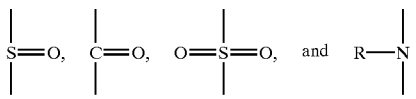

wherein R can be aryl (having from 6 to about 20 carbon atoms, such as phenyl) or acyl (having from 2 to about 20 carbon atoms, such as acetyl, or benzoyl), and

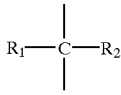

wherein $R_1$ and $R_2$ are selected from the group consisting of hydrogen, alkyl radicals having from 1 to about 4 carbon atoms, and alkenyl radicals having from 2 to about 4 carbon atoms;
  m is zero or 1; and
  X has the formula $DQ_n$, wherein D is a metal from Groups IB to VIII or a metalloid from Groups IIIA to VA of the Periodic Chart of the Elements (Chemical Abstracts version), Q is a halogen atom, and n is an integer having a value of from 1 to 6. Preferably, the metals are copper, zinc, titanium, vanadium, chromium, magnesium, manganese, iron, cobalt, or nickel and the metalloids preferably are boron, aluminum, antimony, tin, arsenic or phosphorous. Preferably, the halogen, Q, is chlorine or fluorine. Illustrative of suitable anions are $BF_4^-$, $PF_6^-$, $SbF_6^-$, $FeCl_4^-$, $SnCl_5^-$, $AsF_6^-$, $SbF_5OH^-$, $SbCl_6^-$, $SbF_5^{-2}$, $AlF_5^{-2}$, $GaCl_4^-$, $InF_4^-$, $TiF_6^{-2}$, $ZrF_6^-$, $CF_3SO_3^-$ and the like. Preferably, the anions are $BF_4^-$, $PF_6^-$, $SbF_6^-$, $AsF_6^-$, $SbF_5OH^-$, and $SbCl_6^-$. More preferably, the anions are $SbF_6^-$, $AsF_6^-$, and $SbF_5OH^-$.

The $Ar_1$ and $Ar_2$ aromatic groups may optionally comprise one or more fused benzo rings (e.g., naphthyl, benzothienyl, dibenzothienyl, benzofuranyl, dibenzofuranyl, etc.). The aromatic groups may also be substituted, if desired, by one or more non-basic groups if they are essentially non-reactive with epoxide and hydroxyl functionalities.

Useful aromatic iodonium complex salts are described more fully in U.S. Pat. No. 4,256,828, which is incorporated herein by reference. The preferred aromatic iodonium complex salts are $(Ar)_2I\ PF_6$ and $(Ar)_2I\ SbF_6$.

The aromatic iodonium complex salts useful in the invention are photosensitive only in the ultraviolet region of the spectrum. However, they can be sensitized to the near ultraviolet and the visible range of the spectrum by sensitizers for known photolyzable organic halogen compounds. Illustrative sensitizers include aromatic amines and colored aromatic polycyclic hydrocarbons, as described in U.S. Pat. No. 4,250,053, incorporated herein by reference.

Aromatic sulfonium complex salt initiators suitable for use in the invention are of the general formula

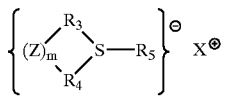

wherein
  $R_3$, $R_4$ and $R_5$ can be the same or different, provided that at least one of the groups is aromatic. These groups can be selected from the group consisting of aromatic moieties having from 4 to about 20 carbon atoms (e.g., substituted and unsubstituted phenyl, thienyl, and furanyl) and alkyl radicals having from 1 to about 20 carbon atoms. The term "alkyl" includes substituted alkyl radicals (e.g., substituents such as halogen, hydroxy, alkoxy, and aryl). Preferably, $R_3$, $R_4$ and $R_5$ are each aromatic; and
  Z, m and X are all as defined above with regard to the iodonium complex salts.

If $R_3$, $R_4$ or $R_5$ is an aromatic group, it may optionally have one or more fused benzo rings (e.g., naphthyl, benzothienyl, dibenzothienyl, benzofuranyl, dibenzofuranyl, etc.). The aromatic groups may also be substituted, if desired, by one or more non-basic groups if they are essentially non-reactive with epoxide and hydroxyl functionalities.

Triaryl-substituted salts such as triphenylsulfonium hexafluoroantimonate and p-(phenyl(thiophenyl) diphenylsulfonium hexafluoroantimonate are the preferred sulfonium salts. Useful sulfonium salts are described more fully in U.S. Pat. No. 4,256,828.

Aromatic sulfonium complex salts useful in the invention are photosensitive only in the ultraviolet region of the spectrum. However, they can be sensitized to the near ultraviolet and the visible range of the spectrum by a select group of sensitizers such as described in U.S. Pat. Nos. 4,256,828 and 4,250,053.

Suitable photoactivatable organometallic complex salts useful in the invention include those described in U.S. Pat. Nos. 5,059,701, 5,191,101, and 5,252,694, each of which is incorporated herein by reference. Such salts of organometallic cations have the general formula:

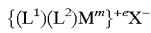

wherein
  $M^m$ represents a metal atom selected from elements of periodic groups IVB, VB, VIB, VIIB and VII, preferably Cr, Mo, W, Mn, Re, Fe, and Co;
  $L^1$ represents none, one, or two ligands contributing π-electrons that can be the same or different ligands selected from the group consisting of substituted and unsubstituted acyclic and cyclic unsaturated compounds and groups, and substituted and unsubstituted carbocyclic aromatic and heterocyclic aromatic compounds, each capable of contributing two to twelve π-electrons to the valence shell of the metal atom M. Preferably, $L^1$ is selected from the group consisting of substituted and unsubstituted $\eta^3$-allyl, $\eta^5$-cyclopentadienyl, $\eta^7$-cycloheptatrienyl compounds, and $\eta^6$-aromatic compounds selected from the group consisting of $\eta^6$-benzene and substituted $\eta^6$-benzene compounds (e.g., xylenes) and compounds having 2 to 4 fused rings, each capable of contributing 3 to 8 π-electrons to the valence shell of $M^m$;

L² represents none or 1 to 3 ligands contributing an even number of σ-electrons that can be the same or different ligands selected from the group consisting of carbon monoxide, nitrosonium, triphenyl phosphine, triphenyl stibine and derivatives of phosphorous, arsenic and antimony, with the proviso that the total electronic charge contributed to $M^m$ by L¹ and L² results in a net residual positive charge of e to the complex; and e is an integer having a value of 1 or 2, the residual charge of the complex cation;

X is a halogen-containing complex anion, as described above.

Examples of suitable salts of organometallic complex cations are disclosed in the aforementioned patents.

Optionally, the organometallic salt initiators can be accompanied by an accelerator such as an oxalate ester of a tertiary alcohol. The accelerator preferably comprises from about 0.1 to about 4% by weight of the total polymerizable mixture (thermoplastic component, thermosetting component, and catalyst(s)), more preferably about 60% of the weight of the metallocene initiator, as described in U.S. Pat. No. 5,252,694, incorporated herein by reference.

Useful commercially available initiators include FX-512™, an aromatic sulfonium complex salt (3M, St. Paul, Minn.), UVI™-6974, an aromatic sulfonium complex salt (Union Carbide Corp., Danbury, Conn.) and IRGACURE™ 261, a cationic organometallic complex salt (Ciba Geigy Chemicals, Hawthorne, N.Y.).

Photoinitiators useful in the invention can be present in an amount in the range of 0.01 to 10 weight percent, preferably 0.01 to 5, most preferably 0.1 to 2 weight percent based on total resin composition.

Certain thermally-activated curing agents for epoxy resins (e.g., compounds that effect curing and crosslinking of the epoxide by entering into a chemical reaction therewith) are useful in the present invention. Preferably, such curing agents are thermally stable at temperatures at which mixing of the components takes place.

Suitable thermal curing agents include aliphatic and aromatic primary and secondary amines, e.g., bis-(4-aminophenyl)sulfone, bis-(4-aminophenyl)ether, and 2,2-bis-(4-aminophenyl)propane; aliphatic and aromatic tertiary amines, e.g., dimethylaminopropylamine and pyridine; fluorene diamines, such as those described in U.S. Pat. No. 4,684,678, incorporated herein by reference; boron trifluoride complexes such as $BF_3 \cdot Et_2O$ and $BF_3 \cdot H_2NC_2H_4OH$; imidazoles, such as methylimidazole; hydrazines, such as adipohydrazine; and guanidines, such as tetramethylguanidine and dicyandiamide (cyanoguanidine, also commonly known as DiCy).

High temperature epoxy catalysts are particularly useful in the present invention. It has been found that simple pyridinium, quinolinium, indoleninium, benzothiazolium, alkyl, aryl and alkylaryl ammonium and phosphonium salts are effective initiators of the cationic polymerization of epoxies in the 250 to 350° C. range. Because of these high exotherm temperatures, these catalysts are particularly suited to use with extrusion temperatures of 200° C. or greater. The compositions are stable in the extruder, i.e., they do not cure, eliminating problems that would be caused by crosslinking during this processing step.

Classes of salts useful as thermal curatives include pyridinium, quinolinium, benzoxazolium, benzothiazolium, indolenium, ammonium, and phosphonium salts. Structures of salts that have been found to be particularly suitable as catalysts in the present invention include:

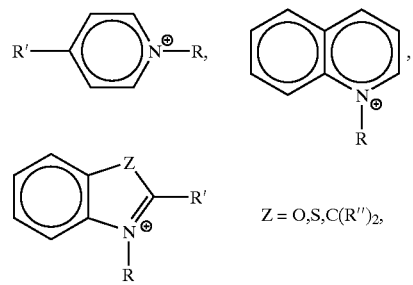

wherein R is an alkyl group or an aryl group, R' is an alkyl group or an acyl group or an aryl group, R" is an alkyl group or an aryl group, R'" is an alkyl group or an aryl group. R and R' together can form a ring structure of from 4 to 8 carbon atoms. (R, R' and R'" together can form a bicyclic ring structure.) Alkyl groups can have 1 to 12 carbon atoms, and aryl groups can be 1 to 3 fused rings (e.g., naphthalene) or joined rings (e.g., biphenyl) having up to 30 carbon atoms. Each cationic charge must be balanced by the appropriate number of anions, X⁻, and wherein X⁻ can be as previously defined, preferably X⁻ is $BF_4^-$, $PF_6^-$, $AsF_6^-$, $SbF_6^-$, or $CF_3SO_3^-$, and most preferably, X⁻ is $PF_6^-$, wherein each R, R', R", R'" independently can be an alkyl, aryl, or alkaryl group having up to 20 carbon atoms, and X is as previously defined.

Thermal curatives can be present in an amount such that the ratio of epoxy equivalents to thermal curative equivalents is in the range of 0.9:1 to 2:1.

Cyanate ester monomers useful in the practice of the present invention comprise at least two —OCN groups, and are given by the general formula $$Q(OCN)_p \qquad (II)$$

where p is an integer from 2 to 7, and wherein Q comprises a mono-, di-, tri-, or tetravalent aromatic hydrocarbon containing from 5 to 30 carbon atoms and zero to 5 aliphatic, cyclic aliphatic, or polycyclic aliphatic, mono-, di-, or trivalent hydrocarbon linking groups containing 7 to 20 carbon atoms. Optionally, Q may comprise 1 to 10 heteroatoms selected from the group consisting of non-peroxidic oxygen, sulfur, non-phosphino phosphorus, non-amino nitrogen, halogen, and silicon. In general, any mono-, di-, or polyfunctional phenolic compound reacted with cyanogen halide in the presence of a base to form a mono-, di-, or polyfunctional aromatic cyanate ester compound may be useful in the present invention.

In the practice of the present invention monomers of formula II may be partially cyclotrimerized to produce useful oligomers. Also, cyanate ester monomers, and oligomers thereof, may be used in combination with other cyanate ester monomers and/or oligomers. Optionally, useful combinations may also comprise one or more monofunctional cyanate ester monomers (i.e., p in formula II is one).

Examples of useful cyanate ester monomers and oligomers include, but are not limited to: 1,3- and 1,4-dicyanatobenzene; 2-tert-butyl-1,4-dicyanatobenzene; 2,4-dimethyl-1,3-dicyanatobenzene; 2,5-di-tert-butyl-1,4-dicyanatobenzene; tetramethyl-1,4-dicyanatobenzene; 4-chloro-1,3-dicyanatobenzene; 1,3,5-tricyanatobenzene;

2,2'- or 4,4'-dicyanatobiphenyl; 3,3',5,5'-tetramethyl-4,4'-dicyanatobiphenyl; 1,3-, 1,4-, 1,5-, 1,6-, 1,8-, 2,6-, or 2,7-dicyanatonaphthalene; 1,3,6-tricyanatonaphthalene; bis(4-cyanatophenyl)methane; 2,2-bis(4-cyanatophenyl)propane (AroCy™ B-10 commercially available from Ciba-Geigy Corp., Ardsley, N.Y., and Skylex™ resins available from Mitsubishi Gas Chemical Co., Tokyo); partially cyclotrimerized oligomers, such as AroCy™ B-30 or B-50 where approximately 30 and 50% of the cyanate ester groups of AroCy™ B-10 have been cyclotrimerized; 1,1,1-tris(4-cyanatophenyl)ethane; 1,1-bis-(4-cyanatophenyl)ethane (AroCy™ L-10); bis(3,5-dimethyl-4-cyanatophenyl) methane (AroCy™ M-10); partially cyclotrimerized oligomers of M-10, such as AroCy™ M-20, M-30, and M-50; 2,2-bis(3,5-dichloro-4-cyanatophenyl)propane; 2,2-bis(3,5-dibromo-4-cyanatophenyl)propane; bis(4-cyanatophenyl) ether; 4,4'-(1,3-phenylenediisopropylidene)diphenylcyanate (AroCy™ XU-366); partially cyclotrimerized oligomers of XU-366, such as AroCy™ XU-378; bis(4-cyanato-phenyl) ketone; bis(4-cyanatophenyl)thioether; bis(4-cyanatophenyl)sulfone; tris(4-cyanato-phenyl)phosphite; tris(4-cyanatophenyl)phosphate; cyanated novolac oligomers having the general formula:

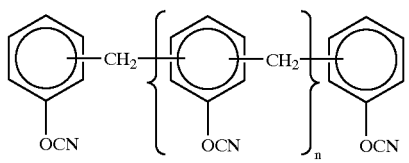

(III)

wherein n is 4 or less, preferably 2 or less, including Primaset™ PT-30, PT-60, PT-90, (all commercially available from Allied-Signal Inc.), and AroCy™ XU-371 (commercially available from Ciba-Geigy Corp.); and polyaromatic cyanate ester oligomers comprising polycyclic aliphatic diradicals, having the general formula:

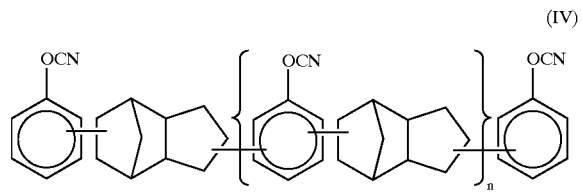

(IV)

wherein n is 4 or less, preferably 2 or less, including Quatrex™ 7187, (available from Dow Chemical).

Preferred cyanate ester monomers and oligomers are those that exist as a liquid, or that exhibit a low melting temperature, e.g., below about 90° C. Liquid or low melting cyanates ester monomers and oligomers may be used individually or in combination with other cyanates ester monomers or oligomers provided that the resulting combination is also a liquid or low melting composition.

Examples of preferred cyanate ester monomers and oligomers include, but are not limited to: 1,1-bis-(4-cyanatophenyl)ethane (AroCy™ L-10), 2,2-bis(4-cyanatophenyl)propane (AroCy™ B-10), bis(3,5-dimethyl-4-cyanatophenyl)methane (AroCy™ M-10), 4,4'-(1,3-phenylenediisopropylidene)diphenylcyanate (AroCy™ XU-366), cyanated novolac oligomers, e.g., those of formula III, and polyaromatic cyanate ester oligomers comprising polycyclic aliphatic diradicals, e.g., those of formula IV.

Polyhydroxyl compounds (e.g., "polyols"), as described above, can be useful in the preparation of cyanate esters useful in the invention.

Cyanate esters useful in the present invention can be cured or polymerized in the presence of an organometallic compound; that is, a compound containing at least one transition metal to carbon covalent bond, with the general formula

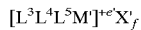

wherein:

L$^3$ represents none or 1 to 12 ligands contributing pi-electrons that can be the same or different, and are selected from cyclic or acyclic aromatic, heteroaromatic, or unsaturated compounds and groups, each capable of contributing 2 to 24 pi-electrons to the valence shell of M';

L$^4$ represents none or 1 to 24 ligands that can be the same or different, each contributing 2, 4, or 6 electrons selected from mono-, di-, and tridentate ligands to the valence shell of M';

L$^5$ represents none or 1 to 12 ligands that can be the same or different, each contributing no more than one electron to the valence shell of each M';

M' represents from 1 to 6 of the same or different metal atoms selected from Ti, Zr, Hf, V, Nb, Ta, Cr, Mo, W, Mn, Tc, Re, Fe, Ru, Os, Co, Rh, Ir, Ni, Pd, and Pt which are commonly referred to as the transition metals;

e' is an integer from 0 to 2 such that the organometallic portion of the molecule is neutral, cationic, or dicationic;

X' is an anion selected from organic sulfonate and halogenated, alkylated, or arylated metal or metalloid groups;

f is an integer from 0 to 2 and is the number of anions required to balance the charge e on the organometallic portion of the molecule;

with the proviso that the organometallic compound contains at least one transition metal to carbon bond and that L$^3$, L$^4$, L$^5$, M', e', X', and f are chosen so as to achieve stable electronic configuration.

Illustrative examples of L$^3$ include ethylene, cyclohexane, acetylene, eta$^5$-cyclopentadienyl, cyclooctadiene, benzene, and pyrene. Illustrative examples of L$^4$ include carbon monoxide, triphenylphosphine, acetonitrile, and 1,2-bis(diphenylphosphillo)ethane. Illustrative examples of L$^5$ include methyl, vinyl, triphenyl tin, and acetyl groups. Illustrative examples of X' include $CF_3SO_3^-$, $(C_6H_5)_4B^-$, $BF_4^-$, $PF_6^-$, $AsF_6^-$, $SbF_6^-$, and $SbF_5OH^-$.

Useful organometallic curing agents have been more completely described in U.S. Pat. No. 5,215,860 (incorporated herein by reference).

Preferred examples of catalysts for cyanate ester cure include, but are not limited to: $(CpFe(CO)_2)_2$, $Mn_2(CO)_{10}$, $(MeCpMo(CO)_3)_2$, $(CpFe(xylene))(SbF_6)$, $(CpFe(cumene))(PF_6)$, $MeCpMn(CO)_3$, $CpFe(CO)_2Cl$, $(benzene)Cr(CO)_3$, $Cp_2TiCl_2$, $MeCpMn(CO)_2PPh_3$, $Mn(CO)_5Br$, $(MeCpMn(CO)_2NO)PF_6$ and $(anisole)Cr(CO)_3$. Cp=eta$^5$-$C_5H_5$, Me=methyl, and Ph=phenyl.

Organometallic compounds useful in the practice of the present invention are available from Strem Chemical Co. (Newburyport, Mass.) or can be prepared by literature methods known to those skilled in the art. See for example *Dictionary of Organometallic Compounds* (Chapman and Hill Ltd. 1984); *Comprehensive Organometallic Chemistry, The Synthesis, Reactions and Structures of Organometallic Compounds* (Pergamon 1982).

The organometallic compounds can be present in a catalytically effective amount, preferably in the range of 0.01 to 20, most preferably 0.1 to 5, parts by weight (pbw) based on 100 parts of the energy-polymerizable composition. In some applications it may be desirable to sorb the organometallic compound onto an inert support such as silica, alumina, clays, etc., as described in U.S. Pat. No. 4,677,137.

The first phase can be present in the range of 30 to 99, preferably 50 to 90, and most preferably 70 to 80 percent by weight, and the second phase can be present in a range (weight percent) of 1 to 70, preferably 10 to 50, and more preferably 20 to 30 of the total network.

The IPN or semi-IPN of the invention can also contain additives, adjuvants, fillers, stabilizers, and the like, so long as such materials do not interfere with formation of the IPN or semi-IPN and are not deleterious to the functions thereof. Stabilizers against thermal and UV degradation can include o-hydroxybenzophenones, cyanoacrylate esters, 2-(o-hydroxyphenyl)benzotriazoles, hindered amine light stabilizers (HALS), copolymerizable UV absorbers and the like. Further additives can include fillers, such as fumed silica, hydrophobic silica (U.S. Pat. Nos. 4,710,536 and 4,749,590), alumina, and natural and synthetic resins in particulate, flake or fibrous form. For various applications, foaming agents, such as low-boiling hydrocarbons; fluorinated materials; colorants, dyes and pigments; flame-retardants; anti-static agents; flow-control agents; and coupling agents for additives, such as silanes, may be added. When additives are present, they are added in amounts consistent with the known functional uses of such additives.

It is also within the scope of this invention to add optional adjuvants such as thixotropic agents; plasticizers; toughening agents such as those taught in U.S. Pat. No. 4,846,905; antioxidants; flow agents; flatting agents; binders; blowing agents; fungicides; bactericides; surfactants; glass and ceramic beads; and reinforcing materials, such as woven and nonwoven webs of organic and inorganic fibers, such as polyester, polyimide, glass fibers and ceramic fibers; and other additives as known to those skilled in the art can be added to the compositions of this invention. These can be added in an amount effective for their intended purpose; typically, amounts up to about 50 parts of adjuvant per total weight of formulation can be used.

Dyes that are useful in the present invention include those having a fluorescent dye group that can be covalently bound to the polymer of the second phase and/or those that are soluble in the polymer of the second phase.

It has been found to be advantageous to attach a dye to a polymer matrix to slow migration of the dye and to enhance dye compatibility. For example, a common fluorescent yellow green dye, Cl Solvent Yellow 98 (SY98, Hoescht Celanese, Charlotte, N.C.), designated by formula V, having the structural formula

V

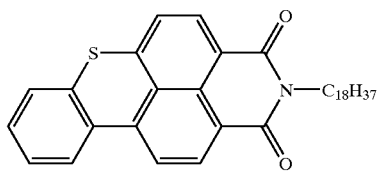

lends itself to simple structural modification through the anhydride precursor. Hydroxy and (meth)acrylate functional dyes that are modifications of Cl Solvent Yellow 98 have been prepared. A hydroxy functional dye, designated YGOH (VI), which can be converted to an acrylate functional dye, designated YGOAc (VII), has been reacted into a urethane, and the acrylate functional dye was incorporated into a chain growth polymer. In this way, the rate of dye migration out of these matrices was slowed. The dyes have the formulae

VI

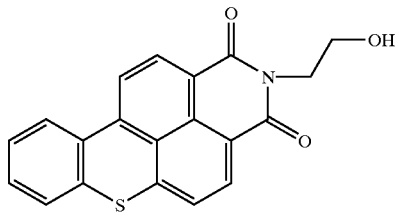

VII

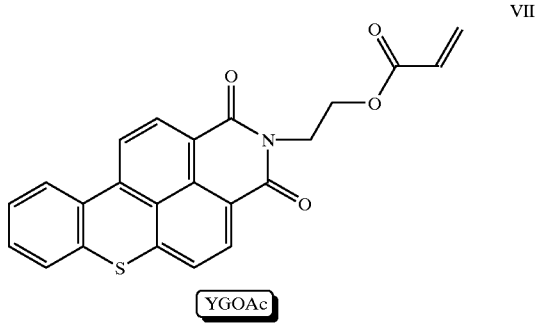

and were prepared by reaction of the corresponding anhydride with the appropriate hydroxy functional primary amine to form, e.g., the hydroxy functional imide VI, from which acrylate VII can be prepared by known methods.

Fluorescent dyes useful in the present invention include dyes from the thioxanthene, xanthene, perylene, perylene imide, coumarin, thioindigoid, naphthalimide and methine dye classes. Useful dye classes have been more completely described in U.S. Pat. No. 5,674,622 (incorporated herein by reference). Representative fluorescent dye examples include, but are not limited to: Lumogen F Orange™ 240 (BASF, Rensselaer, N.Y.); Lumogen F Yellow™ 083 (BASF, Rensselaer, N.Y.); Hostasol Yellow™ 3G (Hoechst-Celanese, Somerville, N.J.); Oraset Yellow™ 8GF (Ciba-Geigy, Hawthorne, N.Y.); Fluorol 088™ (BASF, Rensselaer, N.Y.); Thermoplast F Yellow™ 084 (BASF, Rensselaer, N.Y.); Golden Yellow™ D-304 (DayGlo, Cleveland, Ohio); Mohawk Yellow™ D-299 (DayGlo, Cleveland, Ohio); Potomac Yellow™ D-838 (DayGlo, Cleveland, Ohio) and Polyfast Brilliant Red™ SB (Keystone, Chicago, Ill.).

In a preferred embodiment the fluorescent dyes of the invention are dyes from the thioxanthene and perylene imide classes of compounds. A single fluorescent dye may be used to color an article of the invention or a combination of one or more fluorescent dyes and one or more conventional colorants may be used.

Typically, between about 0.01 and about 2.00 weight percent, and preferably between about 0.05 and about 0.70 weight percent, and most preferably between about 0.1 and about 0.5 weight percent of fluorescent dye (based on total composition) is contained in the article of the present invention. It will be understood that articles with dye loadings outside this range can be used in accordance with the invention. Although dye loading may vary depending upon the final application, these loadings are typical for about a 0.075 to 0.25 mm thick film. However, if the dye is added to a thicker film, lower dye loadings can give the same visual effect. As known by those skilled in the art, articles having heavier dye loadings will exhibit brighter fluorescence and/ or deeper color than will articles with lighter dye loadings of the same dye. However, articles having very high fluorescent dye loadings may exhibit a self-quenching phenomenon which occurs when molecules of the fluorescent dye absorb the energy emitted by neighboring fluorescent dye molecules. This self-quenching causes an undesirable decrease in fluorescent brightness.

In some embodiments, the fluorescent dye in the articles of the present invention will consist essentially of one or more dyes selected from the perylene imide and thioxanthene classes of compounds. In other instances, the article may also contain other coloring agents such as pigments or other dyes in addition to those described to adjust the color and appearance of the article. For example, polycarbonate typically has a yellow cast. Minor amounts, e.g., about 0.01 weight percent or less, of pigments sometimes referred to as "bluing agents" may be incorporated to neutralize the yellow appearance. Other non-fluorescent or conventional dyes or pigments may also be added to the present invention. However, care should be taken in selecting such dyes and dye loadings so that the dyes do not significantly interfere with the performance of the fluorescent dyes. If retroreflective elements are included in the article of the present invention, any dyes or pigments should not undesirably impair the transparency of the article as such would impair the retroreflective properties of the article.

It is within the scope of the present invention to use a conventional dye instead of a fluorescent dye in the IPN or semi-IPN of the invention. Examples of nonfluorescent dye classes that can be used in the present invention include azo, heterocyclic azo, anthraquinone, benzodifuranone, polycyclic aromatic carbonyl, indigoid, polymethine, styryl, di- and tri-aryl carbonium, phthalocyanines, quinophthalones, sulfur, nitro and nitroso, stilbene, and formazan dyes. The concentration of dye needed is specific to each application. However, typically between about 0.01 and about 5.00 weight percent and preferably between about 0.05 and about 2.00 weight percent and most preferably between about 0.1 and 1.00 weight percent of regular dye (based on total composition) is contained in the article of the present invention. It will be understood that articles with dye loadings outside this range can be used in accordance with this invention.

Hindered amine light stabilizers (HALS) can be included in the compositions of the present invention.

Without intending to be bound by theory, it is believed that the combination of the sterically hindered amine, the IPN or semi-IPN matrix and the fluorescent dye in the present invention prevents or lessens degradation and/or reaction between the dye and the matrix which could otherwise occur. Insofar as we know, the advantages of the present invention are attained through the combination of dye, polymer matrix material, and hindered amine light stabilizer described herein. The dyes in the present invention are thought to act as singlet oxygen sensitizers. Energy transfer, which generally occurs from the triplet state of the dye, is quenched by ground state molecular oxygen to produce active singlet oxygen. The singlet oxygen is then free to react with the dye, causing dye degradation. Alternatively, the singlet oxygen may react with the polymer, leading to degradation of the IPN or semi-IPN. However, the hindered amine light stabilizer present in the invention is capable of directly quenching the singlet oxygen formed, preventing initiation of the degradation reactions. The hindered amine light stabilizers can also prevent secondary reactions initiated by polymer oxidation from proceeding. These reactions include a number of radical or peroxide-based chain reactions that are thought to occur in the photo-oxidation of polymers which can result in polymer and dye degradation. Preventing these reactions increases the durability of the polymers and the dye in the dyed system.

Any hindered amine light stabilizer can be suitable for the present invention and include 2,2,6,6-tetraalkyl piperidine compounds, but preferably 2,2,6,6-tetramethyl piperidine compounds are employed as the hindered amine light stabilizers due to the ready availability of the compounds. Preferred stabilizers include:

1) Dimethyl succinate polymer with 4-hydroxy-2,2,6,6-tetramethyl-1-piperidine ethanol available as Tinuvin™ 622 from Ciba-Geigy Corp., Hawthorne, N.Y.;
2) Poly (6((1,1,3,3-tetramethybutyl) amino)-s-triazine-2, 4-diyl) (2,2,6,6-tetramethyl-4-piperidyl)imino) hexamethylene ((2,2,6,6-teramethyl-4-piperidyl)imino)) available as Chimassorb™ 944FL (Ciba-Geigy Corp., Ardsley, N.Y.); and
3) bis(2,2,6,6-tetramethyl-4-piperidinyl) sebacate available as Tinuvin™ 770 from Ciba-Geigy Corp.
4) bis(2,2,6,6-tetramethyl-1-octyloxy-4-piperidinyl sebacate) (Tinuvin™ 123 from Ciba-Geigy Corp.).

The hindered amine light stabilizers are included in articles of the present invention from about 0.05 to about 3.00 weight percent and preferably from about 0.10 to about 2.00 weight percent and most preferably from about 0.1 to about 1.0 weight percent.

Pavement markings (e.g., paint, raised markings, tape) having enhanced daytime visibility can be made incorporating IPNs or semi-IPNs of the invention. Pavement markings typically comprise selected distinctive color(s) so as to make them visible under ambient daytime lighting conditions to effectively guide and signal a motorist. The markings typically contain hiding pigments (e.g. titanium dioxide) to aid in obtaining contrast with the pavement. Night visibility is typically obtained by incorporating retroreflective elements (e.g. glass beads or microspheres) into the marking. To improve the daytime performance, the use of fluorescing colorants has been suggested as discussed in U.S. Pat. No. 3,253,146 to improve performance under daytime conditions of poor visibility, such as at dusk and on overcast days.

A construction utilizing a transparent fluorescent layer over a white or tinted substrate would give the best performance because mixing hiding pigments into a fluorescent layer can substantially kill the fluorescent effect. Laminated constructions of the invention are particularly preferred because of enhanced visibility and improved durability. Improved nighttime performance can be achieved by incorporating glass microspheres in the top layer of the construction.

IPNs and semi-IPNs of the present invention find use as fibers, fabrics, canvas markings, roll-up signs, barrel wraps, cone sleeves, truck markings, license plates, safety vests, pavement marking paints and tapes, reflective films, and other articles where flexible materials having dye durability are desired. These materials preferably are fluorescent. The materials of the present invention are particularly useful in safety applications and devices, such as in fluorescent traffic signs, where dye stability and durability are highly valued.

Objects and advantages of the invention are further illustrated by the following examples, but the particular materials and amounts thereof recited in these examples, as well as other conditions and details, should not be construed to unduly limit this invention. Unless otherwise stated, all parts are parts by weight and all temperatures are degrees centigrade.

In the examples, below, non-fluorescent dyes can be substituted for fluorescent dyes.

In the examples the following evaluation methods were used:

Weathering Studies. The films prepared in the Examples were exposed to a water cooled Xenon Arc device (6500 Watt Xenon Burner filtered by borosilicate inner and outer filters, Model 65XWWR, Atlas Electric Devices Co., Chicago, Ill.) according to ASTM standard G-26-96 Type B, BH. The amount of fluorescent dye retained in the sample was determined by measuring the major dye absorption band (456 nm) before and after weathering using UV-Vis spectroscopy. Following Beer's Law, a decrease in absorbance is related to a reduction in dye concentration. For Examples 1A–1F and 5A–5E, a "percent fluorescent dye retention" value was calculated as the ratio of the peak absorbance in the weathered sample to the peak absorbance of the original unweathered sample. A similar "percent fluorescent dye retention" value was calculated for Examples 2A–F, 6, 7, and 9. However, for these examples the value was calculated as the ratio of the area under the absorbance peak in the weathered sample to the area under the absorbance peak of the original unweathered sample.

Migration Studies. Migration studies were conducted to confirm that the dye had become covalently attached to the network. Three layers of clear Morthane PNO3 polyurethane film (aliphatic polyester polyurethane with added UV absorber, Morton International, Inc., Chicago, Ill.) were stacked on top of the fluorescent films, sandwiched between two polyethylene terephthalate (PET) liners (51 μm) and placed in a press at 221 KPa (32 psi) for 72 hrs at 23° C. and 24 hours at 66° C. Movement of the dye into the clear layers indicated unattached dye. A "% dye retention after migration" value was calculated as the ratio of the peak absorbance after exposure to the peak absorbance prior to exposure as described in Weathering Studies, above.

Dye Extraction Studies. Dye extraction studies were also conducted to evaluate dye attachment to the IPN. IPN films comprising either the nonfunctional fluorescent dye, SY98, or one of the functional fluorescent dyes, YGOH or YGOAc, were placed in refluxing tetrahydrofuran (THF) for 24 hours, removed, and then dried at 20–23° C. for 72 hours. The amount of dye retained by the films was calculated using UV-Vis as described in Weathering Studies, above.

Dynamic Mechanical Analysis (DMA). Dynamic mechanical analysis was performed on the samples using a Seiko DMS200 Tension Module calibrated with a polycarbonate standard (Seiko Instruments Inc., Sunnyvale, Calif.). The sample dimensions were set according to the instrument requirements, and were typically 15 mm long by 6.35 mm wide, the frequency was 1 Hz and the heating rate was 2° C./min. The reported Tg values were taken as the peak of the tan delta curve.

Tensile Testing. Tensile properties were determined using an Instron Model 1122 with Series IX software (Instron Corp., Park Ridge, Ill.). A minimum of 5 specimens were tested for each sample. The specimen width was 1.24 cm (0.5 inches), the gap separation was 5.08 cm (2 inches) and rate of strain was 15.24 cm/min (6 inches/minute). Results are presented as the average of five specimens.

Fluorescence. In the present invention, fluorescence was measured using a SLM AB2 Luminescence Spectrophotometer (SLM Instruments, Rochester, N.Y.) using a 150 watt continuous Xenon lamp.

Retained fluorescence was calculated as the ratio, in percent, of fluorescent intensity of the sample after exposure to weathering for the indicated length of time to the fluorescent intensity of an unexposed sample, at the wavelength of peak emission of the unexposed sample.

EXAMPLE 1

Effect of Dye Placement and Aromaticity and an Example of a Crosslinked Urethane Continuous Phase and an Acrylate Dispersed Phase The unique interpenetrating polymer network (IPN) feature of microphase separated domains provides a mechanism to control the placement of the fluorescent dye into only one of the two domains and to control the chemical nature of the dye microenvironment within each domain. In one set of examples (1A–D), the dye was placed in the urethane domain by reacting the hydroxyl functional dye into the urethane network. In a second set of examples (1E–H), the dye was placed in the acrylate domain by copolymerizing the acrylate functional dye into the acrylate network. The nature of the dye microenvironment was varied by changing the aromatic vs. aliphatic content of each of the two networks. Controlling the level of aromaticity around the dye allowed investigation of the effect of dye environment on dye stability. The samples were weathered according to ASTM G-26-96 in the xenon arc device for 232 hours and then analyzed for percent peak retention as described above in the Weathering Studies section. The sample preparation is described below while the weathering results are shown in Table 1.

EXAMPLE 1A

In a 100 mL plastic beaker, 13.63 g phenoxyethyl acrylate (POEA, Sartomer™ SR339, Sartomer Co., Exton, Pa.) containing 0.125 g dissolved YGOH dye (structure VI.), 1.48 g isocyanurate-containing polyisocyanate (Desmodur N-3300™, Bayer Chemicals, Pittsburgh, Pa.) and 0.015 g dibutyltin dilaurate catalyst (DBTDL, Aldrich Chemical Co., Milwaukee, Wis.) was combined with a solution of 3.00 g POEA containing 0.35 g dissolved di-(4-t-butylcyclohexyl)peroxydicarbonate thermal free-radical initiator (Perkadox™ 16, Akzo Nobel Chemicals Inc., Stratford, Conn.), 1.00 g caprolactone acrylate (Sartomer™ SR 495), 0.05 g BYK-066™ flow control agent (BYK-Chemie, Wallingford, Conn.), 15.01 g ethoxylated Bisphenol A polyol (Synfac 8024™, Milliken Chemical, Spartanburg, S.C.), 0.88 g ethoxylated bisphenol A diacrylate, (EBAD, Sartomer™ SR 349), 0.38 g Uvinul N-3039™ UV stabilizer (BASF Corporation, Rensselaer, N.Y.) and 0.50 g Tinuvin 123™ hindered amine light stabilizer (Ciba-Geigy Corp., Ardsley, N.Y.). The solution was mixed with a spatula, treated with 16.01 g of Desmodur N-3300™ isocyanurate-containing polyisocyanate, agitated with an air mixer for 1 minute and degassed under vacuum (500 mm Hg) for 3 minutes. The solution was knife coated between two 15.2 cm wide silicone-coated PET release liners (102 μm thick, Courtaulds Aerospace, Inc., Glendale, Calif.) at a thickness of 102 μm, cured with a temperature ramp from 70° C. to 120° C. (2.5° C./min) and postcured at 90° C. for 16–17 hours.

EXAMPLE 1B

An IPN was prepared as described in Example 1A, except that 0.25 g Perkadox™ 16 was used, 18.06 g caprolactone polyol (Tone™ 201, Union Carbide Corp., Danbury, Conn.) was used in place of the Synfac 8024 polyol, and in the final mixing step, 12.97 g of Desmodur N-3300 was used.

EXAMPLE 1C

An IPN was prepared as described in Example 1A, except that 13.63 g tetrahydrofurfuryl acrylate, (THFA, Sartomer™

SR285, Sartomer Chemical Co., Exton, Pa.) was used in place of POEA.

EXAMPLE 1D

An IPN was prepared as described in Example 1B, except that 13.63 g THFA was used in place of POEA.

EXAMPLE 1E

An IPN film was prepared as described in Example 1, except that: YGOAc dye (structure VII) was used in place of YGOH dye; no Desmodur N-3300 isocyanate was used in the initial mix; 0.0075 g DBTDL was used; and 17.49 g Desmodur N-3300 isocyanate was used in the final mix.

EXAMPLE 1F

An IPN was prepared as described in Example 1E, except that 0.25 g Perkadox 16 initiator was used and 18.06 g Tone 201 polyol was used in place of Synfac 8024 polyol.

EXAMPLE 1G

An IPN was prepared as described in Example 1E, except that 13.63 g THFA was used in place of POEA.

EXAMPLE 1H

An IPN was prepared as described in Example 1F, except that 13.63 g THFA was used in place of POEA.

TABLE 1

Data for Example 1: Effect of Changing the Local Dye Environment on Dye Durability

| Example | Dye | Polyol | Acrylate | % Dye Retained after 232 Hours Weathering |
|---|---|---|---|---|
| 1A* | YGOH | Synfac 8024 | EBAD/POEA (5/95) | 31 |
| 1B* | YGOH | Tone 201 | EBAD/POEA (5/95) | 32 |
| 1C* | YGOH | Synfac 8024 | HDDA/THFA (5/95) | 18 |
| 1D* | YGOH | Tone 201 | HDDA/THFA (5/95) | 17 |
| 1E | YGOAc | Synfac 8024 | EBAD/POEA (5/95) | 70 |
| 1F | YGOAc | Tone 201 | EBAD/POEA (5/95) | 74 |
| 1G | YGOAc | Synfac 8024 | HDDA/THFA (5/95) | 41 |
| 1H | YGOAc | Tone 201 | HDDA/THFA (5/95) | 28 |

*Comparative: Dye in first phase

The data in Table 1 show that for this combination of a crosslinked urethane for the continuous phase and a crosslinked acrylate for the second phase, the dye was more durable when it was located in the second phase. The dye retention of the crosslinked films was increased by using aromatic second phases which is believed to oxidize sacrificially thereby protecting the fluorescent dye. Adding aromatic components to the first phase did not significantly affect the dye retention. In summary, it appeared that the best dye durability was achieved when the acrylate fluorescent dye was placed in a dispersed aromatic acrylate phase as shown in Examples 1E and 1F while the continuous urethane phase could be either aromatic or aliphatic since the composition of the urethane phase had little influence on the overall weathering.

The results from Example 1 indicate that fluorescence durability was controlled through the second phase material, leaving the first or continuous phase material to provide the desired mechanical properties. Therefore, these results indicated that the dye durability and the physical properties of the material were independently controlled.

EXAMPLE 2

Demonstration of Different Continuous and Dispersed Phases 2A-1. EMAA/Acrylate with YGOAc In this example a semi-IPN was prepared with an ethylene-methacrylic acid copolymer, EMAA (Nucrel 699™, DuPont Chemicals, Wilmington, Del.) and mono-functional and difunctional acrylate monomers. Weathering additives were added to help protect both the dye and polymer. A photoinitiator comprising a 1:1 mixture of 2,4, 6-trimethylbenzoyl diphenyl phosphine oxide and 2-methyl-2-hydroxypropriophenone (Darocur™ 4265, Ciba-Geigy Corp., Tarrytown, N.Y.) was added and the resulting films were cured using a Sylvania 350BL UV lamp (Siemens Corp./Osram Sylvania Inc,. Danvers, Mass.). The dye used was YGOAc (structure VII).

To 21.17 g of a Nucrel 699 polymer melt prepared in a 160° C. Brabender mixing head at 50 rpm (C. W. Brabender Instruments, Inc., South Hackensack, N.J.) and cooled to 150° C., 0.27 g Tinuvin™ 770 hindered amine light stabilizer (Ciba-Geigy Corp.); 0.27 g Chimassorb™ 944 hindered amine light stabilizer (Ciba-Geigy Corp.); 0.27 g Darocur 4265 photoinitiator; 0.28 g ethoxylated bisphenol A diacrylate; and 0.039 g YGOAc dissolved in 5.00 g POEA were added. After the final addition, mixing continued for five minutes at 150° C. (100 rpm). The mixture was removed and pressed between 102 μm (4 mil) polyethylene terephthalate (PET)-silicone release liners into films using a platen press at 208 MPa (30,000 psi) heated to 110° C., then cured for 15 minutes on each side simultaneously using Sylvania 350BL bulbs.

Finally, the sample was analyzed by fluorescent confocal microscopy. The dispersed acrylate phase was fluorescent while the continuous phase was not, which indicated that the acrylate functional fluorescent dye covalently attached to the acrylate phase.

2A-2. EMAA with YGOAc (Comparative)

In this example an EMAA film was prepared as described in Example 2A-1, except that mono- and di-functional acrylates were not added. Also, 26.70 g of Nucrel 699 was used. Since there were no acrylate monomers used, the photoinitiator and the final UV cure step were omitted.

2B-1. Polyurethane (PU)/Acrvlate with YGOAc

In this example a semi-IPN was prepared with an aliphatic polyester polyurethane, PU, Morthane L424.167 (Morton International Inc., Chicago, Ill.) and mono- and di-functional acrylate monomers.

To 19.04 g of a Morthane L424.167 polymer melt prepared in a 155° C. Brabender mixing head (50 rpm) were added 0.24 g Tinuvin 622; 0.045 g fluorescent dye YGOAc; 0.27 g Darocur 4265; 0.28 g EBAD; and 4.65 g POEA. After the final addition, mixing continued for five minutes at 155° C. and 100 rpm. The mixture was removed and pressed between 102 μm PET-silicone release liners into films using a platen press at 172 MPa (25,000 psi) heated to 120° C. and then cured for 15 minutes on each side simultaneously using Sylvania 350BL UV bulbs.

2B-2. Polyurethane (PU)/Epoxy with YGOH

In this example a semi-IPN was prepared, using Morthane L424.167 and a difunctional epoxy monomer (Epon™ 828, Shell Chemicals, Houston, Tex.). Weathering additives were added to help protect both the dye and polymer.

To 21.16 g of a Morthane L424.167 polymer melt prepared in a 150° C. Brabender mixing head (50 rpm) were added 0.27 g Tinuvin 770; 0.27 g Chimassorb 944; 0.034 g fluorescent dye YGOH; and 0.11 g triphenylsulfonium hexafluoroantimonate photoinitiator (see U.S. Pat. No.

4,256,828, Example 37) dissolved in 5.43 Epon™ 828. After the final addition, mixing continued for five minutes at 150° C. and 100 rpm. The mixture was removed and pressed between 102 μm PET-silicone release liners into films using a platen press at 208 MPa heated to 150° C. and then passed under the medium pressure mercury UV lamp (American UltraViolet Co., Murray Hill, N.J.) twice at a setting of 118 W/cm and a speed of 6.1 m/min. to yield a dose of 0.56 J/cm$^2$ per pass. After the UV exposure the sample was heated at 120° C. for 30 minutes.

2B-3. Polyurethane/Cyanate Ester with YGOH

A semi-IPN film was prepared from an aliphatic polyester polyurethane and a difunctional cyanate ester monomer (AroCy™ B-10, Ciba-Geigy Corp., Ardsley, N.Y.). Weathering additives were added to help protect both the dye and polymer, and the resulting films were cured using a medium pressure mercury UV lamp (American UltraViolet Co., Murray Hill, N.J.) followed by heating.

To 20.87 g of a Morthane L424.167 polymer melt prepared in a 150° C. Brabender mixing head (50 rpm) were added 0.26 g Tinuvin 770; 0.26 g Chimassorb 944; 0.024 g YGOH; and a solution of 0.08 g (1-methyl-2,4-cyclopentadien-1-yl)-manganese tricarbonyl catalyst (Aldrich Chemical Company, Milwaukee, Wis.) dissolved in 3.80 g AroCy™ B-10. After the final addition, mixing continued for five minutes at 150° C. and 100 rpm. The mixture was removed and pressed between two 51 μm untreated PET liners into films using a platen press at 208 MPa heated to 150° C. One of the liners was removed, and the sample was passed under the medium pressure mercury UV lamp on a setting of 118 W/cm and a speed of 6.1 m/min to yield a dose of 0.71 J/cm$^2$. After the UV exposure, the sample was heated at 130° C. for 30 minutes.

2C-1. EAA/Acrylate with YGOAc

In this example a semi-IPN was prepared with an ethylene-acrylic acid copolymer (EAA, Primacor™ 3440, Dow Chemical Co., Midland, Mich.) and mono- and di-functional acrylate monomers. Weathering additives were added to help protect both the dye and polymer.

To 20.70 g of a EAA polymer melt prepared in a 150° C. Brabender mixing head at 50 rpm, 0.26 g Tinuvin 770; 0.26 g Chimassorb 944; 0.26 g Darocur 4265 photoinitiator; 0.26 g EBAD; and 0.038 g YGOAc dissolved in 4.90 g POEA were added. After the final addition, mixing continued for five minutes at 150° C. (100 rpm). The mixture was removed and pressed between 102 μm PET-silicone release liners into films using a platen press at 208 MPa heated to 150° C., then cured for 15 minutes on each side simultaneously using Sylvania 350BL UV bulbs.

2C-2. EAA with YGOAc (Comparative)

A film was prepared from an EAA polymer and fluorescent dye YGOAc in the absence of additional acrylate monomers.

To 26.12 g of EAA polymer melt (Primacor 3440) prepared in a 150° C. Brabender mixing head at 50 rpm, 0.26 g Tinuvin 770; 0.26 g Chimassorb 944 and 0.038 g YGOAc were added. After the final addition, mixing continued for five minutes at 150° C. (100 rpm). The mixture was removed and pressed between 102 μm PET-silicone release liners into films using a platen press at 208 MPa heated to 150° C.

2D-1. LDPE/Acrylate with YGOAc

A semi-IPN film was prepared from a low density polyethylene, LDPE, (Dow 4012™, Dow Chemical Co., Midland, Mich.) and mono- and di-functional acrylate monomers. Weathering additives were added to help protect both the dye and polymer.

To 21.16 g of a Dow 4012 polymer melt prepared in a 185° C. Brabender mixing head at 50 rpm and cooled to 151° C. were added 0.27 g Tinuvin 770; 0.27 g Chimassorb 944; 0.27 g Darocur 4265; 0.27 g EBAD; 0.039 g YGOAc and 5.00 g POEA. After the final addition, mixing continued for five minutes at 151° C. (100 rpm). The mixture was removed and pressed between 102 μm PET-silicone release liners into films using a platen press at 208 MPa heated to 130° C., then cured for 15 minutes on each side simultaneously using a Sylvania 350BL UV bulb.

2D-2. LDPE with YGOAc (Comparative)

An LDPE film was prepared using only Dow 4012 LDPE and fluorescent dye YGOAc.

To 26.70 g of a Dow 4012 polymer melt prepared in a 185° C. Brabender mixing head at 50 rpm were added 0.27 g Tinuvin 770; 0.27 g Chimassorb 944 and 0.039 g of fluorescent dye YGOAc. After the final addition, mixing continued for five minutes at 185° C. (100 rpm). The mixture was removed and pressed between 102 μm PET-silicone release liners into films using a platen press at 208 MPa heated to 170° C.

2E-1. PVC/Acrylate with YGOAc

A semi-IPN film was prepared from polyvinyl chloride polymer, PVC, (Formula S00354, Alpha Chemical and Plastics Corporation, Pineville, N.C.) and mono- and di-functional acrylate monomers. The PVC used was a plasticized formula containing flame retardant, fungicide, thermal stabilizers and costabilizers, lubricant and processing aids, benzophenone UV absorber and optical brightener. Additional weathering additives were added to this formulation to help protect both the dye and polymer.

To 24.65 g of the PVC polymer melt prepared in a 180° C. Brabender mixing head at 50 rpm and cooled to 150° C. were added 0.23 g Tinuvin 770; 0.23 g Chimassorb 944; 0.23 g Darocur 4265; 0.23 g EBAD; and 0.033 g YGOAc dissolved in 4.25 g POEA. After the final addition, mixing continued for five minutes at 150° C. (100 rpm). The mixture was removed and pressed between 102 μm PET-silicone release liners into films using a platen press at 208 MPa heated to 180° C., then cured for 15 minutes on each side simultaneously using a Sylvania 350BL UV bulb.

2E-2. PVC with YGOAc (Comparative)

In this example a PVC film was prepared with a polyvinyl chloride polymer, PVC, (formula S00354 from Alpha Chemical and Plastics Corporation, Pineville, N.C.) and an acrylate functional fluorescent dye (YGOAc, see structure VII), without added acrylate monomers.

To 29.62 g of the PVC polymer melt prepared in 180° C. Brabender mixing head at 50 rpm 0.23 g Tinuvin 770; 0.23 g Chimassorb; and 0.033 g YGOAc were added. After the final addition, mixing continued for five minutes at 180° C. (100 rpm). The mixture was removed and pressed between 102 μm polyethylene terephthalate (PET)-silicone release liners into films using a platen press at 208 Mpa (30,000 psi) heated to 150° C.

2F-1. S-I-S/Acrylate with YGOAc

A semi-IPN film was prepared with a styrene-isoprene-styrene (S-I-S) block copolymer (Kraton™ D1107, Shell Chemical Co., Naperville, Ill.) and mono- and di-functional acrylate monomers. Weathering additives were added to help protect both the dye and polymer.

To 21.16 g of a Kraton D1107 polymer melt prepared in a 185° C. Brabender mixing head at 50 rpm and cooled to 154° C. were added 0.27 g Tinuvin 770; 0.27 g Chimassorb 944; 0.27 g Darocur 4265; 0.27 g EBAD; 0.039 g YGOAc and 5.10 g POEA. After the final addition, mixing continued for five minutes at 154° C. (100 rpm). The mixture was removed and pressed between 102 μm PET-silicone release liners into films using a platen press at 208 MPa heated to 130° C., then cured for 15 minutes on each side simultaneously using a Sylvania 350BL UV bulb.

2F-2. S-I-S with YGOAc (Comparative)

An elastomeric film was prepared from Kraton D1107 YGOAc fluorescent dye, without added acrylate monomers.

To 26.72 g of a Kraton D1107 polymer melt prepared in a 185° C. Brabender mixing head at 50 rpm were added 0.27 g Tinuvin 770; 0.27 g Chimassorb 944; and 0.041 g YGOAc. After the final addition, mixing continued for five minutes at 185° C. (100 rpm). The mixture was removed and pressed between 102 μm PET-silicone release liners into films using a platen press at 208 MPa heated to 170° C.

Table 2, below, summaries Examples 2A-1 through 2F-2 with respect to the continuous phase composition, the dispersed phase composition, the type of dye and weight percent dye used in the overall composition, the thickness of the film, and the effect on fluorescent dye durability of adding various fluorescent dyes to resins with and without a dispersed phase when subjected to accelerated weathering.

EXAMPLE 3A

In a 100 mL plastic beaker, 23.87 g of polyol KM-10-1733™ (available from Stahl USA, Peabody, Mass.) containing 0.13 g dissolved SY98 dye, (structure V) was combined with a solution of 3.75 g THFA, containing 0.125 g Perkadox™ 16 and 0.05 g BYK-066™, a solution of 3.75 g propoxylated neopentyl glycol diacrylate, (Sartomer™ SR 9003, Sartomer Company, Inc.) containing 0.0075 g DBTDL, 7.5 g isooctyl acrylate (IOA, 3M, St. Paul, Minn.), and 1.00 g caprolactone acrylate. The solution was mixed with a spatula, treated with 11.23 g of an aliphatic polyisocyanate (Desmodur N-100™, Bayer Chemicals, Pittsburgh, Pa.), agitated with an air mixer for 1 minute and degassed under vacuum (500 mm Hg) for 3 minutes. The solution was knife coated between two 15.2 cm wide silicone-coated PET release liners (102 μm thick, Courtaulds Aerospace, Inc., Glendale, Calif.) at a thickness of 76 μm, cured with a temperature ramp from 50° C. to 120° C. (3.5° C./min) and postcured at 90° C. for 16–17 hours.

TABLE 2

Formulations and Percent Fluorescent Dye Retention After Accelerated Weathering

| Ex. # | First Phase | Second Phase | Dye | Wt % Dye | Film Thickness (mm) | 50 hours | 100 hours | 150 hours | 200 hours | 300 hours |
|---|---|---|---|---|---|---|---|---|---|---|
| 2A-1 | EMAA | Acrylate | YGOAc | 0.14 | 0.18 | | 54 | | | |
| 2A-2* | EMAA | None | YGOAc | 0.14 | 0.19 | | 9 | | | |
| 2B-1 | PU | Acrylate | YGOAc | 0.18 | 0.09 | | 77 | | | |
| 2B-2 | PU | Epoxy | YGOH | 0.12 | 0.15 | 87 | | 63 | | |
| 2B-3** | PU | Cyanate Ester | YGOH | 0.12 | 0.19 | 87 | | 69 | | |
| 2C-1 | EAA | Acrylate | YGOAc | 0.14 | 0.23 | | 39 | | | |
| 2C-2* | EAA | None | YGOAc | 0.14 | 0.24 | | 13 | | | |
| 2D-1 | LDPE | Acrylate | YGOAc | 0.14 | 0.18 | | 59 | | | |
| 2D-2* | LDPE | None | YGOAc | 0.14 | 0.15 | | 50 | | | |
| 2E-1 | PVC | Acrylate | YGOAc | 0.11 | 0.14 | | 83 | | 72 | 63 |
| 2E-2* | PVC | None | YGOAc | 0.11 | 0.13 | | 81 | | 66 | 54 |
| 2F-1† | S-I-S | Acrylate | YGOAc | 0.14 | 0.17 | 40 | 29 | | | |
| 2F-2*† | S-I-S | None | YGOAc | 0.14 | 0.13 | 34 | 10 | | | |

*Comparative
**Cured onto an 51 μm (2.0 mil) untreated PET liner. The liner remained in place during weathering
†Laminated between two 51 μm (2.0 mil) untreated PET liners before weathering. These liners remained in place during weathering.

The data in Table 2 show that adding a dispersed second phase containing a fluorescent dye to a polymeric continuous phase provided good fluorescent dye retention and enhanced fluorescent dye durability on exposure to accelerated weathering compared to samples without a dispersed second phase. This point was demonstrated for example, when comparing examples 2A-1 with 2A-2; 2C-1 with 2C-2; 2D-1 with 2D-2; 2E-1 with 2E-2; and 2F-1 with 2F-2. In each of these cases, the sample with the addition of a second phase retained more fluorescent color after a specified period of time compared to the sample without the second phase.

EXAMPLE 3

Preventing Dye Migration

To overcome the common loss mechanism of dye migration in flexible matrices, functionalized fluorescent dyes (YGOH and YGOAc) were reacted into the urethane or acrylate components of the IPN respectively. Dye migration and extraction studies were conducted according to above cited methods. The results from the migration studies are shown in Table 3 as % Dye Retention after Migration. This number refers to the percent of fluorescent dye that remained in the original film after the migration study was complete. The remaining dye had migrated to the other clear sheets. The results of the extraction studies are shown in Table 3, below, as % Dye Retention after Extraction.

EXAMPLE 3B

Example 3B was prepared as described in Example 3A except 0.013 g of YGOH fluorescent dye, (structure VI) was used in place of the SY98 fluorescent dye.

EXAMPLE 3C

In this example a semi-IPN was prepared with an ethylene-methacrylic acid copolymer (EMAA), Nucrel 699 (DuPont Chemicals, Wilmington, Del.) and monofunctional and difunctional acrylate monomers. The fluorescent dye was an acrylate functional fluorescent dye (YGOAc, see structure VII above).

To 19.0 g of a Nucrel 699 polymer melt prepared in a 125° C. Brabender mixing head at 50 rpm, 0.12 g Tinuvin 770; 0.12 g Chimassorb 944; 0.24 g Darocur 4265; 0.24 g EBAD; and 0.045 g YGOAc dissolved in 4.51 g POEA were added. After the final addition, mixing continued for five minutes at 125° C. (120 rpm). The mixture was removed and pressed between 102 μm PET-silicone release liners into 102 μm films using a platen press at 208 MPa (30,000 psi) heated to 110° C., then cured for 15 minutes on each side simultaneously using Sylvania 350BL bulbs.

EXAMPLE 3D

In this example a semi-IPN was prepared with an aliphatic polyester polyurethane, PU, Morthane L424.167 and monofunctional and difunctional acrylate monomers. Weathering additives were added to help protect both the dye and polymer. The fluorescent dye was an acrylate functional fluorescent dye (YGOAc, see structure VII above).

To 19.0 g of a Morthane L424.167 polymer melt prepared in a 155° C. Brabender mixing head (50 rpm) were added 0.12 g Tinuvin 622; 0.12 g Tinuvin 770; 0.045 g YGOAc; 0.24 g Darocur 4265; 0.24 g EBAD; and 4.51 g POEA. After the final addition, mixing continued for five minutes at 155° C. and 100 rpm. The mixture was removed and pressed between 4 mil PET-silicone release liners into 102 µm films using a platen press at 172 MPa (25,000 psi) heated to 120° C. and then cured for 15 minutes on each side simultaneously using Sylvania 350BL bulbs.

TABLE 3

Migration and Extraction Studies

| Example Number | IPN/ semi-IPN | Dye | % Dye Retention after Migration | % Dye Retention after Extraction |
|---|---|---|---|---|
| 3A | IPN | SY98 | 20 | 1 |
| 1E | IPN | YGOAc | 97 | 84 |
| 3B | IPN | YGOH | 97 | 98 |
| 3C | semi-IPN | YGOAc | 96 | na |
| 3D | semi-IPN | YGOAc | 99 | na | na = Not available

The data in Table 3 show that the functional dyes, YGOH or YGOAc, were bound to the IPN networks and were not readily able to migrate or be easily extracted. (Migration relates to physical removal of the dye.) In contrast, the nonfunctional fluorescent dye, SY98, almost completely migrated out of the IPN materials and was completely extracted, indicating that the unbound dye was highly mobile in the IPN materials. The results from Table 3 strongly indicated that the functional fluorescent dyes were covalently attached to the interpenetrating polymer network.

EXAMPLE 4

Mechanical Properties

Several of the Examples previously described were subjected to tensile testing and dynamic mechanical analysis as described earlier to examine the range of properties that can be obtained from the IPN materials. The results from these tests are shown in Table 4.

TABLE 4

Mechanical Properties of Selected Examples Containing Acrylate Second Phase

| Example Number | Weathering (% Dye Retention) | % Elongation at Break | Ultimate Tensile (MPa) | Modulus (MPa) | Tg (° C.) |
|---|---|---|---|---|---|
| 1E | 70 (232 hours) | 14 | 28.4 | 955.0 | 9, 51 |
| 1F | 74 (232 hours) | 100 | 3.0 | 11.0 | −12 |
| 1G | 41 (232 hours) | 108 | 32.3 | 451.0 | 37 |
| 2B-1 | 77 (100 hours) | 406 | 30.0 | 22.6 | 14 |

As shown in Table 4, the mechanical properties of these materials were varied widely by changing the continuous first phase while keeping the dispersed acrylate second phase unchanged. An optimal dye microenvironment was maintained through the acrylate phase while obtaining a variety of physical properties through choice of the continuous first phase. This concept is clearly shown by comparing the results in Table 4 for Example 1E and Example 1F where the % dye retention for the two samples were almost identical whereas the mechanical properties changed dramatically. Finally, it should be noted that the mechanical properties described in Table 4 should not be considered as upper and lower limits. In general, the range of mechanical properties that can be obtained will be more similar to the range of properties obtained when considering all possible first phase materials as specified above.

EXAMPLE 5

Effect of HALS

The addition of hindered amine light stabilizers (HALS) was evaluated as to their effect on fluorescent dye durability. IPN films containing Tinuvin 123™ (HALS) were prepared with loadings ranging from zero to two percent HALS and weathered in accelerated weathering chambers as described above. The sample preparation is given below while the data is shown in Table 5.

EXAMPLE 5A

In a 100 mL plastic beaker, 23.71 g of polyol KM-10-1733™ containing dissolved YGOH dye (0.125 g), (structure VI) was combined with a solution of 1.75 g IOA containing 0.125 g dissolved Perkadox™ 16 and 0.05 g BYK-066™, a solution of 1.0 g EBAD containing 0.0075 g DBTDL, 2.0 g IOA, 10.25 g EBAD, 1.00 g caprolactone acrylate, 0.38 g Uvinul N-3039™ and 0.00 g Tinuvin 123™. The solution was mixed with a spatula, treated with 11.29 g of Desmodur N-3300™, agitated with an air mixer for 1 minute and degassed under vacuum (500 mm Hg) for 3 minutes. The solution was knife coated between two 15.2 cm wide silicone-coated PET release liners at a thickness of 102 µm, cured with a temperature ramp from 70° C. to 120° C. (2.5° C./min) and postcured at 90° C. for 16–17 hours.

EXAMPLE 5B

Example 5B was prepared according to Example 5A except that 0.05 g Tinuvin 123™ and a total of 0.15 g of Perkadox 16™ were added.

EXAMPLE 5C

Example 5C was prepared according to Example 5A except that 0.25 g Tinuvin 123™ and a total of 0.23 g of Perkadox 16™ were added.

EXAMPLE 5D

Example 5D was prepared according to Example 5A except that 0.50 g Tinuvin 123™ and a total of 0.33 g of Perkadox 16™ were added.

EXAMPLE 5E

Example 5E was prepared according to Example 5A except that 1.0 g Tinuvin 123™ and a total of 0.63 g of Perkadox 16™ were added.

TABLE 5

Effect of HALS Loading on Fluorescent Dye Durability

| Example Number | % HALS (Tinuvin 123) | % Dye Retained after 204 Hours Weathering |
|---|---|---|
| 5A | 0.0 | 35 |
| 5B | 0.1 | 55 |
| 5C | 0.5 | 63 |
| 5D | 1.0 | 61 |
| 5E | 2.0 | 75 |

In Table 5, the data show that the fluorescent dye durability improved with increasing levels of HALS, at least up to loadings of two percent.

EXAMPLE 6

Effect of Adding a Second Phase when Using Nonfunctional Fluorescent Dyes

In this example, a nonfunctional fluorescent dye is added to a semi-IPN composition. Specifically, SY98 is added to an EMAA/Acrylate based semi-IPN. The samples were weathered according to ASTM G-26-96 in the xenon arc device and then analyzed for percent peak retention as described above in the Weathering Studies section. The sample preparation is described below while the weathering results are shown in Table 6.

EXAMPLE 6A

In this example a semi-IPN was prepared with an ethylene-methacrylic acid copolymer (EMAA), Nucrel 699 and monofunctional and difunctional acrylate monomers. The fluorescent dye was a non-functional fluorescent dye (SY98, see structure V).

To 19.0 g of a Nucrel 699 polymer melt prepared in a 125° C. Brabender mixing head at 50 rpm, 0.12 g Tinuvin 770; 0.12 g Chimassorb 944; 0.24 g Darocur 4265; 0.24 g EBAD; and 0.045 g SY98 dissolved in 4.51 g POEA were added. After the final addition, mixing continued for five minutes at 125° C. (120 rpm). The mixture was removed and pressed between 102 μm polyethylene terephthalate (PET)-silicone release liners into films using a platen press at 208 MPa (30,000 psi) heated to 110° C., then cured for 15 minutes on each side simultaneously using Sylvania 350BL bulbs.

EXAMPLE 6B

In this example an EMAA film was prepared with an ethylene-methacrylic acid copolymer, EMAA, (Nucrel 699) and a non-functional fluorescent dye (SY98, see structure V).

To 24.0 g of a Nucrel 699 polymer melt prepared in a 150° C. Brabender mixing head at 50 rpm, 0.24 g Chimassorb 944 and 0.045 g of SY98 were added. After the final addition, mixing continued for five minutes at 150° C. (100 rpm). The mixture was removed and pressed between 102 μm polyethylene terephthalate (PET)-silicone release liners into films using a platen press at 172 MPa (25,000 psi) heated to 120° C.

TABLE 6

Effect of Using a Nonfunctional Fluorescent Dye on Accelerated Weathering

| Ex. # | First Phase | Second Phase | Dye | Wt % Dye | Film Thickness (mm) | 100 hours |
|---|---|---|---|---|---|---|
| 6A | EMAA | Acrylate | SY98 | 0.2 | 0.13 | 25 |
| 6B* | EMAA | None | SY98 | 0.2 | 0.10 | 11 |

*Comparative

The data in Table 6 show that when a nonfunctional fluorescent dye was used, fluorescent dye retention was enhanced upon the addition of the second phase to the thermoplastic. This indicated that adding a second component to enhance fluorescent dye durability was useful even when functional fluorescent dyes were not available or could not be used for other reasons.

EXAMPLE 7

Demonstration of Varying Levels of Dispersed Phase

In this example semi-IPNs were prepared with ethylene-methacrylic acid copolymer, Nucrel 699, with varying levels of acrylate monomer. Acrylate levels ranged from 0 to 40 weight percent. Examples were prepared according to example 2A-1 differing only in the amount of acrylate monomer.

TABLE 7

Effect of Varying Levels of Acrylate on Percent Fluorescent Dye Retained

| Example Number | % Total Acrylate | % Fluorescent Dye Retained After 100 hrs Weathering |
|---|---|---|
| 2A-2* | 0.0 | 9 |
| 7A | 5.0 | 26 |
| 7B | 10.0 | 34 |
| 7C | 15.0 | 43 |
| 2A-1 | 20.0 | 54 |
| 7D | 25.0 | 48 |
| 7E | 30.0 | 56 |
| 7F | 40.0 | 60 |

*Comparative

In Table 7, the data show the fluorescent dye retention improved with increasing levels of acrylate with a significant improvement in fluorescent dye retention being observed at a level of 5% acrylate.

EXAMPLE 8

Demonstration of Enhanced Retention of Fluorescent Emission Intensities

The fluorescent emission intensities of examples 2A-1, 2A-2, and 7A-F were measured before and after weathering. Intensities were measured and a "% Fluorescent Emission Intensity Retained" value was calculated as described in the Fluorescence section above.

TABLE 8

Percent Fluorescent Emission Retained

| Example # | % Total Acrylate | % Fluorescent Emission Intensity Retained after 100 hours Weathering |
|---|---|---|
| 2A-2* | 0.0 | 37 |
| 7A | 5.0 | 82 |
| 7B | 10.0 | 98 |
| 7C | 15.0 | 96 |
| 2A-1 | 20.0 | 102 |
| 7D | 25.0 | 89 |
| 7E | 30.0 | 95 |
| 7F | 40.0 | 88 |

*Comparative

In Table 8 the data show that the retention of fluorescent emission intensity increased with increasing levels of acrylate then reached a plateau at 10% acrylate.

EXAMPLE 9
Demonstration of Other Applicable Dye Classes Besides Thioxanthene The benefit of a dispersed second phase can be shown in numerous classes of dyes including thioxanthene and perylene imide. Semi-IPN, Example 9A, was prepared with a perylene imide fluorescent dye, Lumogen™ F Red 300 (BASF, Rensselaer, N.Y.) according to the method of Example 2A-1, differing only in the replacement of the 0.14% YGOAc thioxanthene fluorescent dye with 0.2% Lumogen F Red 300 perylene imide fluorescent dye. Example 9B was the comparative made according to Example 9A but without acrylate monomers or a photoinitiator.

TABLE 9

Percent Perylene Imide Fluorescent Dye Lumogen F Red 300 Retention after Weathering

| Example No. | Description | 100 hours | 200 hours | 300 hours |
|---|---|---|---|---|
| 9A | EMAA with Acrylate | 79 | 65 | 52 |
| 9B* | EMAA without Acrylate | 76 | 40 | 14 |

*Comparative

In Table 9, the data show that Lumogen F Red 300, a perylene imide fluorescent dye, also benefited from the addition of a dispersed second phase.

Various modifications and alterations of this invention will become apparent to those skilled in the art without departing from the scope and intent of this invention, and it should be understood that this invention is not to be unduly limited to the illustrative embodiments set forth herein.

What is claimed is:

1. An interpenetrating polymer network (IPN) or semi-interpenetrating polymer network (semi-IPN) comprising
   a) a first phase being continuous and comprising a flexible polymer, and
   b) a second phase being a fluorescently durable dispersed or continuous phase and comprising a fluorescent dye and a polymer, wherein said polymer enhances durability of the fluorescent dye.
   wherein said polymer of said first phase comprises an olefin copolymer and said polymer of said second phase comprises an aromatic polyacrylate.

2. An interpenetrating polymer network (IPN) or semi-interpenetrating polymer network (semi-IPN) comprising
   a) a first phase being continuous and comprising a flexible polymer, and
   b) a second phase being a fluorescently durable dispersed or continuous phase and comprising a fluorescent dye and a polymer, wherein said polymer enhances durability of the fluorescent dye,
   wherein said polymer of said first phase is selected from the group consisting of polyurethanes, polyolefins, copolymers of olefins, block copolymers, polyvinyl chloride, natural and synthetic rubbers, silicone rubber, and fluoroelastomers,
   wherein said polyolefin is a homopolymer or copolymer of an alpha-olefin.

3. An interpenetrating polymer network (IPN) or semi-interpenetrating polymer network (semi-IPN) comprising
   a) a first phase being continuous and comprising a flexible polymer, and
   b) a second phase being a fluorescently durable dispersed or continuous phase and comprising a fluorescent dye and a polymer, wherein said polymer enhances durability of the fluorescent dye,
   wherein said second phase is selected from the group consisting of polymers of acrylates epoxies, and cyanate esters,
   wherein said epoxy polymer is derived from polymerization of 1,2-, 1,3-, and 1,4-cyclic ethers.

4. An interpenetrating polymer network (IPN) or semi-interpenetrating polymer network (semi-IPN) comprising
   a) a first phase being continuous and comprising a flexible polymer, and
   b) a second phase being a fluorescently durable dispersed or continuous phase and comprising a fluorescent dye and a polymer, wherein said polymer enhances durability of the fluorescent dye,
   wherein the polymer of said first phase has a Tg of at most 40° C.

5. The IPN or semi-IPN according to claim 3 further comprising a curative for said epoxy monomers which is at least one of a photocatalyst or a thermal curing agent.

6. An interpenetrating polymer network (IPN) or semi-interpenetrating polymer network (semi-IPN) comprising
   a) a first phase being continuous and comprising a flexible polymer, and
   b) a second phase being a fluorescently durable dispersed or continuous phase and comprising a fluorescent dye and a polymer, wherein said polymer enhances durability of the fluorescent dye,
   wherein said second phase is selected from the group consisting of polymers of acrylates, epoxies, and cyanate esters,
   wherein said polymer is prepared by polymerization of cyanate ester monomers or oligomers.

7. The IPN or semi-IPN according to claim 6 wherein said cyanate ester monomer or oligomer is cured in the presence of an effective amount of an organometallic compound.

* * * * *

UNITED STATES PATENT AND TRADEMARK OFFICE
CERTIFICATE OF CORRECTION

PATENT NO. : 6,395,844 B1
DATED : May 28, 2002
INVENTOR(S) : Barrera, Denise A.

It is certified that error appears in the above-identified patent and that said Letters Patent is hereby corrected as shown below:

Column 6,
Line 57, "thereof They" should be -- thereof. They --

Column 14,
Line 52, "VII" should be -- VIII --

Column 16,
Line 15, insert the last line of the formula -- ⊕ NRR'R"R'", and ⊕ PRR'R"R'" --

Column 18,
Line 44, "(diphenylphosphillo)" should be -- (diphenylphosphino) --

Column 20,
Line 47, "SB" should be -- 5B --

Column 26,
Line 43, "Acrvlate" should be -- Acrylate --

Signed and Sealed this

Fifth Day of October, 2004

JON W. DUDAS
*Director of the United States Patent and Trademark Office*